United States Patent
Hosseini et al.

(10) Patent No.: US 10,992,433 B2
(45) Date of Patent: Apr. 27, 2021

(54) SYMBOL MAPPING FOR A DOWNLINK CONTROL CHANNEL

(71) Applicant: QUALCOMM incorporated, San Diego, CA (US)

(72) Inventors: Seyedkianoush Hosseini, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 16/167,964

(22) Filed: Oct. 23, 2018

(65) Prior Publication Data

US 2019/0123868 A1 Apr. 25, 2019

Related U.S. Application Data

(60) Provisional application No. 62/577,158, filed on Oct. 25, 2017.

(51) Int. Cl.
*H04L 5/00* (2006.01)

(52) U.S. Cl.
CPC .......... *H04L 5/0044* (2013.01); *H04L 5/0048* (2013.01); *H04L 5/0053* (2013.01); *H04L 5/0058* (2013.01); *H04L 5/0091* (2013.01); *H04L 5/0007* (2013.01)

(58) Field of Classification Search
None
See application file for complete search history.

(56) References Cited

U.S. PATENT DOCUMENTS

2015/0208391 A1* 7/2015 Park .................. H04L 5/0094
370/329
2020/0178236 A1* 6/2020 Gong ................ H04W 72/0406

FOREIGN PATENT DOCUMENTS

EP 2898621 A1 7/2015
EP 2898621 B1 * 3/2016 ........... H04L 5/0055

OTHER PUBLICATIONS

International Search Report and Written Opinion—PCT/US2018/057352—ISA/EPO—dated Mar. 19, 2019.
Partial International Search Report—PCT/US2018/057352—ISA/EPO—dated Jan. 21, 2019.

* cited by examiner

*Primary Examiner* — Kouroush Mohebbi
(74) *Attorney, Agent, or Firm* — Holland & Hart LLP/Qualcomm

(57) ABSTRACT

Methods, systems, and devices for wireless communication are described. In some wireless communications systems, a base station may transmit downlink control information (DCI) to a user equipment (UE) in a search space of a shortened transmission time interval (sTTI) using a particular aggregation level. The aggregation level may correspond to the number of control channel elements (CCEs) used to transmit the DCI in the search space. In some cases, various aggregation levels may be supported for transmitting DCI to the UE, and the aggregation levels may be nested such that the CCEs of a lower aggregation level may be included in the CCEs of a higher aggregation level. In such cases, in order to allow a UE to correctly identify the DCI transmitted using a particular aggregation level, the base station may map the modulation symbols of the DCI to resource element groups (REGs) differently for different aggregation levels.

42 Claims, 15 Drawing Sheets

| sREG Index | AL 1 | AL 2 | AL 4 | AL 8 |
|---|---|---|---|---|
| 0 | 0 | 0 | 0 | 0 |
| 1 | 1 | 4 | 8 | 16 |
| 2 | 2 | 1 | 1 | 1 |
| 3 | 3 | 5 | 9 | 17 |
| 4 | | 2 | 2 | 2 |
| 5 | | 6 | 10 | 18 |
| 6 | | 3 | 3 | 3 |
| 7 | | 7 | 11 | 19 |
| 8 | | | 4 | 4 |
| 9 | | | 12 | 20 |
| 10 | | | 5 | 5 |
| 11 | | | 13 | 21 |
| 12 | | | 6 | 6 |
| 13 | | | 14 | 22 |
| 14 | | | 7 | 7 |
| 15 | | | 15 | 23 |
| 16 | | | | 8 |
| 17 | | | | 24 |
| 18 | | | | 9 |
| 19 | | | | 25 |
| 20 | | | | 10 |
| 21 | | | | 26 |
| 22 | | | | 11 |
| 23 | | | | 27 |
| 24 | | | | 12 |
| 25 | | | | 28 |
| 26 | | | | 13 |
| 27 | | | | 29 |
| 28 | | | | 14 |
| 29 | | | | 30 |
| 30 | | | | 15 |
| 31 | | | | 31 |

SYMBOL MAPPING FOR A DOWNLINK CONTROL CHANNEL

CROSS REFERENCES

The present application for patent claims benefit of U.S. Provisional Patent Application No. 62/577,158 by Hosseini et al., entitled "Symbol Mapping For Downlink Control Channel," filed Oct. 25, 2017, assigned to the assignee hereof and expressly incorporated by reference in its entirety.

BACKGROUND

The following relates generally to wireless communication and more specifically to symbol mapping for a downlink control channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some wireless communications systems (e.g., NR systems), a base station may communicate with a UE on a carrier using shortened transmission time intervals (sTTIs). The base station may transmit a control channel (e.g., a shortened physical downlink control channel (sPDCCH)) within the sTTI to schedule downlink transmissions or uplink transmissions within the sTTI. In some cases, the base station may transmit the control channel in control channel elements (CCEs) of a search space, and the UE may monitor the CCEs of the search space to identify the control channel. Conventional techniques for transmitting a control channel in CCEs of a search space may be deficient.

SUMMARY

In some wireless communications systems, a base station may transmit downlink control information (DCI) to a user equipment (UE) in a search space of a shortened transmission time interval (sTTI) using a particular aggregation level. The aggregation level may correspond to the number of control channel elements (CCEs) used to transmit the DCI in the search space. In some cases, various aggregation levels may be supported for transmitting DCI to the UE, and the aggregation levels may be nested such that the CCEs of a lower aggregation level may be included in the CCEs of a higher aggregation level. In such cases, in order to allow a UE to correctly identify the DCI transmitted using a particular aggregation level, the base station may map the modulation symbols of the DCI to resource element groups (REGs) in one or more CCEs differently for different aggregation levels. As such, there may be no ambiguity between DCI transmitted using different aggregation levels, and the UE may be able to identify the DCI in a search space transmitted using a particular aggregation level.

A method for wireless communication is described. The method may include identifying control information for transmission on a downlink control channel, encoding the control information into a plurality of modulated control symbols, mapping the plurality of modulated control symbols to available resources of an aggregation level candidate on the downlink control channel, where the mapping differs based at least in part on an aggregation level associated with the downlink control channel, and transmitting the encoded control information on the downlink control channel.

An apparatus for wireless communication is described. The apparatus may include means for identifying control information for transmission on a downlink control channel, means for encoding the control information into a plurality of modulated control symbols, means for mapping the plurality of modulated control symbols to available resources of an aggregation level candidate on the downlink control channel, where the mapping differs based at least in part on an aggregation level associated with the downlink control channel, and means for transmitting the encoded control information on the downlink control channel.

Another apparatus for wireless communication is described. The apparatus may include a processor, memory in electronic communication with the processor, and instructions stored in the memory. The instructions may be operable to cause the processor to identify control information for transmission on a downlink control channel, encode the control information into a plurality of modulated control symbols, map the plurality of modulated control symbols to available resources of an aggregation level candidate on the downlink control channel, where the mapping differs based at least in part on an aggregation level associated with the downlink control channel, and transmit the encoded control information on the downlink control channel.

A non-transitory computer-readable medium for wireless communication is described. The non-transitory computer-readable medium may include instructions operable to cause a processor to identify control information for transmission on a downlink control channel, encode the control information into a plurality of modulated control symbols, map the plurality of modulated control symbols to available resources of an aggregation level candidate on the downlink control channel, where the mapping differs based at least in part on an aggregation level associated with the downlink control channel, and transmit the encoded control information on the downlink control channel.

Some examples of the method, apparatus, and non-transitory computer-readable medium described above may further include processes, features, means, or instructions for interleaving the plurality of modulated control symbols prior to the mapping of the plurality of modulated control symbols. In some examples of the method, apparatus, and non-transitory computer-readable medium described above, mapping the plurality of modulated control symbols to the available resources includes mapping the interleaved plurality of modulated control symbols to the available resources one-by-one from a lowest resource element (RE) index to a highest RE index.

In some examples of the method, apparatus, and non-transitory computer-readable medium described above, mapping the plurality of modulated control symbols to the available resources includes mapping out-of-order the plurality of modulated control symbols to a plurality of REG indices or RE indices such that the REG indices or the RE indices may be interleaved. In some examples of the method, apparatus, and non-transitory computer-readable medium described above, mapping the plurality of modulated control symbols includes mapping in order the plurality of modulated control symbols to the available resources of the aggregation level candidate for an aggregation level of one.

In some examples of the method, apparatus, and non-transitory computer-readable medium described above, mapping the plurality of modulated control symbols includes mapping out-of-order the plurality of modulated control symbols to the available resources of the aggregation level candidate for an aggregation level greater than one. In some examples of the method, apparatus, and non-transitory computer-readable medium described above, different out-of-order mappings may be used for different aggregation levels greater than one.

In some examples of the method, apparatus, and non-transitory computer-readable medium described above, the downlink control channel may be a cell-specific reference signal (CRS)-based downlink control channel that includes consecutive REGs in each CCE. Some examples of the method, apparatus, and non-transitory computer-readable medium described above may further include processes, features, means, or instructions for transmitting an indication of the mapping of the plurality of modulated control symbols to the available resources.

A method for wireless communication is described. The method may include receiving a plurality of modulated control symbols over interleaved resources of an aggregation level candidate on a downlink control channel, de-interleaving the resources based at least in part on an aggregation level associated with the downlink control channel, and decoding the plurality of modulated control symbols into control information.

An apparatus for wireless communication is described. The apparatus may include means for receiving a plurality of modulated control symbols over interleaved resources of an aggregation level candidate on a downlink control channel, means for de-interleaving the resources based at least in part on an aggregation level associated with the downlink control channel, and means for decoding the plurality of modulated control symbols into control information.

Another apparatus for wireless communication is described. The apparatus may include a processor, memory in electronic communication with the processor, and instructions stored in the memory. The instructions may be operable to cause the processor to receive a plurality of modulated control symbols over interleaved resources of an aggregation level candidate on a downlink control channel, de-interleave the resources based at least in part on an aggregation level associated with the downlink control channel, and decode the plurality of modulated control symbols into control information.

A non-transitory computer-readable medium for wireless communication is described. The non-transitory computer-readable medium may include instructions operable to cause a processor to receive a plurality of modulated control symbols over interleaved resources of an aggregation level candidate on a downlink control channel, de-interleave the resources based at least in part on an aggregation level associated with the downlink control channel, and decode the plurality of modulated control symbols into control information.

In some examples of the method, apparatus, and non-transitory computer-readable medium described above, the resources include a plurality of interleaved REGs or REs. In some examples of the method, apparatus, and non-transitory computer-readable medium described above, the aggregation level associated with the downlink control channel may be greater than one. In some examples of the method, apparatus, and non-transitory computer-readable medium described above, the downlink control channel may be a CRS-based downlink control channel that includes consecutive REGs in each CCE. Some examples of the method, apparatus, and non-transitory computer-readable medium described above may further include processes, features, means, or instructions for receiving an indication of the interleaving of the resources.

A method for wireless communication is described. The method may include receiving a plurality of modulated control symbols interleaved over resources of an aggregation level candidate on a downlink control channel, de-interleaving the plurality of modulated control symbols based at least in part on an aggregation level associated with the downlink control channel, and decoding the plurality of modulated control symbols into control information.

An apparatus for wireless communication is described. The apparatus may include means for receiving a plurality of modulated control symbols interleaved over resources of an aggregation level candidate on a downlink control channel, means for de-interleaving the plurality of modulated control symbols based at least in part on an aggregation level associated with the downlink control channel, and means for decoding the plurality of modulated control symbols into control information.

Another apparatus for wireless communication is described. The apparatus may include a processor, memory in electronic communication with the processor, and instructions stored in the memory. The instructions may be operable to cause the processor to receive a plurality of modulated control symbols interleaved over resources of an aggregation level candidate on a downlink control channel, de-interleave the plurality of modulated control symbols based at least in part on an aggregation level associated with the downlink control channel, and decode the plurality of modulated control symbols into control information.

A non-transitory computer-readable medium for wireless communication is described. The non-transitory computer-readable medium may include instructions operable to cause a processor to receive a plurality of modulated control symbols interleaved over resources of an aggregation level candidate on a downlink control channel, de-interleave the plurality of modulated control symbols based at least in part on an aggregation level associated with the downlink control channel, and decode the plurality of modulated control symbols into control information.

In some examples of the method, apparatus, and non-transitory computer-readable medium described above, the resources include a plurality of REs or REGs, the plurality of modulated control symbols being interleaved over the plurality of REs or REGs. In some examples of the method, apparatus, and non-transitory computer-readable medium described above, the aggregation level associated with the downlink control channel may be greater than one. In some examples of the method, apparatus, and non-transitory computer-readable medium described above, the downlink control channel may be a CRS-based downlink control channel that includes consecutive REGs in each CCE. Some examples of the method, apparatus, and non-transitory computer-readable medium described above may further include processes, features, means, or instructions for receiving an indication of the interleaving of the plurality of modulated control symbols over the resources.

BRIEF DESCRIPTION OF THE DRAWINGS

FIG. 4 illustrates an example table showing the order in which modulated control symbols may be mapped to resources for different aggregation levels in accordance with aspects of the present disclosure.

DETAILED DESCRIPTION

Figure 1:
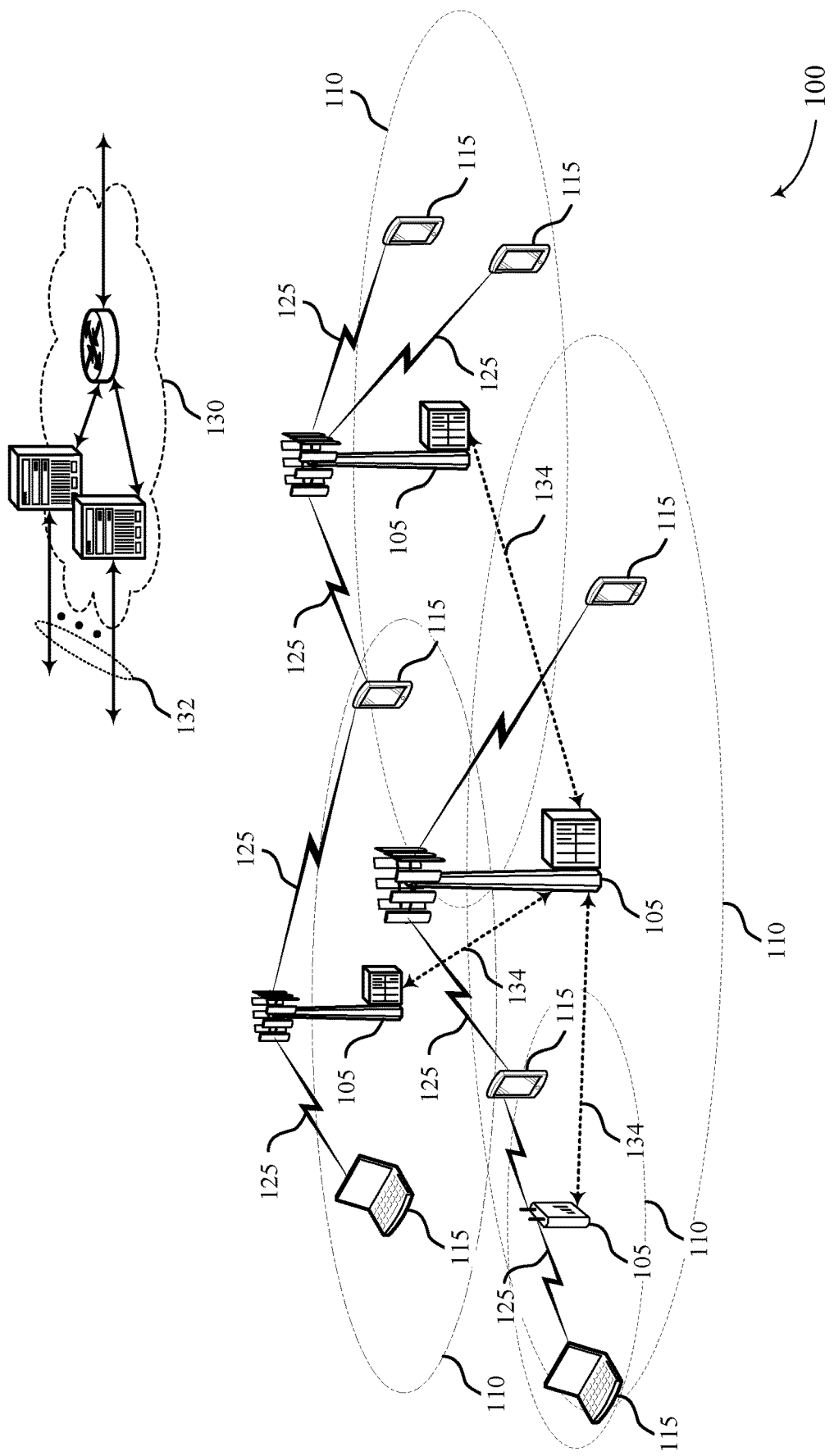
FIGS. 1 and 2 illustrate examples of wireless communications systems that support symbol mapping for a downlink control channel in accordance with aspects of the present disclosure.

Some wireless communications systems may support communication between a base station and a user equipment (UE) on a carrier using shortened transmission time intervals (sTTIs). The base station may transmit control information to the UE in a control channel (e.g., a shortened physical downlink control channel (sPDCCH)) in a search space of the sTTI, and the UE may monitor the search space for the control channel. The base station may transmit the control information in the control channel using a particular aggregation level depending on various factors (e.g., channel conditions, importance of the control information, etc.). The aggregation level may correspond to the number of control channel elements (CCEs) used to transmit the control channel in the search space to the UE.

In some wireless communications systems, various aggregation levels may be supported such that a base station may be able to transmit control information to a UE in a search space using a wide range of aggregation levels. The UE may perform blind decoding of the control channel in the search space since the UE may not be aware of the aggregation level or CCEs used to transmit the control channel. In some cases, different aggregation levels configured for transmitting a control channel to a UE may be nested. That is, the CCEs of a lower aggregation level may be included in the CCEs of a higher aggregation level. In such cases, because the control information may be repeated in CCEs of an aggregation level and the modulation symbols of the control information may be mapped to CCEs in the same order for different aggregation levels, a UE may erroneously identify control information associated with one aggregation level in a search space although the control information was transmitted by the base station using another aggregation level. Thus, the UE may not be able to correctly identify the control information transmitted by a base station, and, as such, the UE may not be able to identify appropriate resources for receiving data from the base station, which may result in reduced throughput in a wireless communications system.

As described herein, a base station may support efficient techniques for mapping modulated control symbols to CCEs differently for different aggregation levels such that a UE may be able to correctly identify the control channel transmitted by a base station using a particular aggregation level. That is, the UE may be able to differentiate between a control channel transmitted using one aggregation level and a control channel transmitted using another aggregation level, even when the two aggregation levels are nested (i.e., with overlapping CCEs). In some aspects, for some aggregation levels (e.g., aggregation level 1), the base station may map the modulated control symbols to resource element groups (REGs) or resource elements (REs) in the order in which the modulation symbols were generated. However, for other aggregation levels, the base station may map the modulated control symbols to REGs or REs in a different order from the order in which the modulated control symbols were generated. In one aspect, the base station may interleave the modulated control symbols and then map the interleaved modulated control symbols to REs. In another aspect, the base station may map the modulated control symbols to interleaved REGs.

Aspects of the disclosure introduced above are described below in the context of a wireless communications system. Examples of processes and signaling exchanges that support symbol mapping for a downlink control channel are then described. Aspects of the disclosure are further illustrated by and described with reference to apparatus diagrams, system diagrams, and flowcharts that relate to symbol mapping for a downlink control channel.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as radio heads, smart radio heads, or transmission/reception points (TRPs). In some configurations, various functions of each access network entity or base station 105 may be distributed across various network devices (e.g., radio heads and access network controllers) or consolidated into a single network device (e.g., a base station 105).

The communication links 125 between a UE 115 and base station 105 may be or represent an organization of physical resources, such as time and frequency resources. A basic unit of time and frequency may be referred to as an RE. An RE may consist of one symbol period and one subcarrier (e.g., a 15 kHz frequency range). In some wireless communications systems (e.g., LTE systems), a resource block may include 12 consecutive subcarriers in the frequency domain and, for a normal cyclic prefix in each orthogonal frequency division multiplexing (OFDM) symbol, 7 consecutive OFDM symbols in the time domain (1 slot), or 84 REs. In other wireless communications systems (e.g., low latency systems), a resource block may include 12 consecutive subcarriers in the frequency domain and one (1) symbol in the time domain, or 12 REs. The number of bits carried by each RE may depend on the modulation scheme (the configuration of symbols that may be selected during each symbol period). Thus, the more resource blocks that a UE receives and the higher the modulation scheme, the higher the data rate may be.

In wireless communications system 100, a transmission time interval (TTI) may be defined as the smallest unit of time in which a base station 105 may schedule a UE 115 for uplink or downlink transmissions. As an example, a base station 105 may allocate one or more TTIs for downlink communication with a UE 115. The UE 115 may then monitor the one or more TTIs to receive downlink signals from the base station 105. In some wireless communications systems (e.g., LTE), a subframe may be the basic unit of scheduling or TTI. In other cases, such as with low latency operation, a different, reduced-duration TTI (e.g., an sTTI) may be used. Wireless communications system 100 may employ various TTI durations.

In some cases, an sTTI may contain less symbols than a subframe (e.g., 7 symbols). The sTTI may include a control channel (e.g., a physical downlink control channel (PDCCH)) used to schedule downlink or uplink communication on a data channel (e.g., a physical downlink shared channel (PDSCH)) within the sTTI. In other words, the sTTI may be self-contained. Because an sTTI may include only a few symbols (e.g., less than other TTIs), an sTTI may be configured with an sPDCCH used to transmit control information to a UE 115. The sPDCCH may include short CCEs (sCCEs) and short REGs (sREGs) that may include control information for a UE 115. The number of sCCEs used to transmit an sPDCCH may be referred to as an aggregation level, and the sCCEs monitored at an aggregation level for an sPDCCH may be referred to as an sPDCCH candidate (or aggregation level candidate). An sREG may consist of a resource block that includes 12 subcarriers within one OFDM symbol. The number of symbols used for control signaling (e.g., used as a control channel) may be configured by higher layer signaling.

In some cases, a base station 105 may transmit cell-specific reference signals (CRSs) to a UE 115, and the UE 115 may use these CRSs to perform channel estimation for decoding DCI received in an sPDCCH from the base station 105. In such cases, the sPDCCH may be referred to as a CRS-based sPDCCH. Further, the sREGs mapped to an sCCE may be contiguous, and, in this case, the sPDCCH may be referred to as a localized sPDCCH or a localized CRS-based sPDCCH. Alternatively, the sREGs mapped to an sCCE may not be contiguous, and, in this case, the sPDCCH may be referred to as a distributed sPDCCH or a distributed CRS-based sPDCCH. The sREGs may be mapped to sCCEs and indexed in a frequency-first time-second manner. The index of an sREG may be given by the following equation:

$$n \cdot N_{sREG}^{sCCE} + j,$$

$$n = 0, \ldots, N(sCCE, p) - 1, \text{ and}$$

$$j = 0, \ldots, N_{sREG}^{sCCE} \quad (1)$$

where $N_{sREG}^{sCCE}$ corresponds to the number of sREGs in an sCCE (e.g., four) and $N(sCCE, p)$ corresponds to the number of sCCEs in a control resource block set p.

In wireless communications system 100, various aggregation levels may be supported such that a base station 105 may be able to transmit control information to a UE 115 in a search space using a wide range of aggregation levels. The UE 115 may perform blind decoding of the control channel in the search space since the UE may not be aware of the aggregation level or sCCEs used to transmit the control channel. In some cases, different aggregation levels configured for transmitting a control channel to a UE may be nested. That is, the sCCEs of a lower aggregation level may be included in the sCCEs of a higher aggregation level. In such cases, because the control information may be repeated across sCCEs forming a candidate of a given aggregation level and the modulation symbols of the control information may be mapped to sCCEs in the same order for different aggregation levels, a UE 115 may erroneously identify the control information as being transmitted with one aggregation level in a search space although the control information was transmitted by the base station 105 using another aggregation level.

If a UE 115 is unable to correctly identify the control channel transmitted by a base station 105, the UE 115 may not be able to correctly rate-match data around the resources used to transmit the control information (e.g., a downlink grant) in the control channel, which may result in reduced throughput in a wireless communications system. Wireless communications system 100 may support efficient techniques for mapping modulated control symbols to sCCEs differently for different aggregation levels such that a UE 115 may be able to correctly identify the control channel transmitted by a base station 105 using a particular aggregation level. Specifically, a base station 105 may map modulated control symbols in a control information transmission to sCCEs based on the aggregation level of the control information transmission. Such techniques may be used to map modulated control symbols to sCCEs in a localized CRS-based control channel or a distributed CRS-based control channel.

Figure 2:
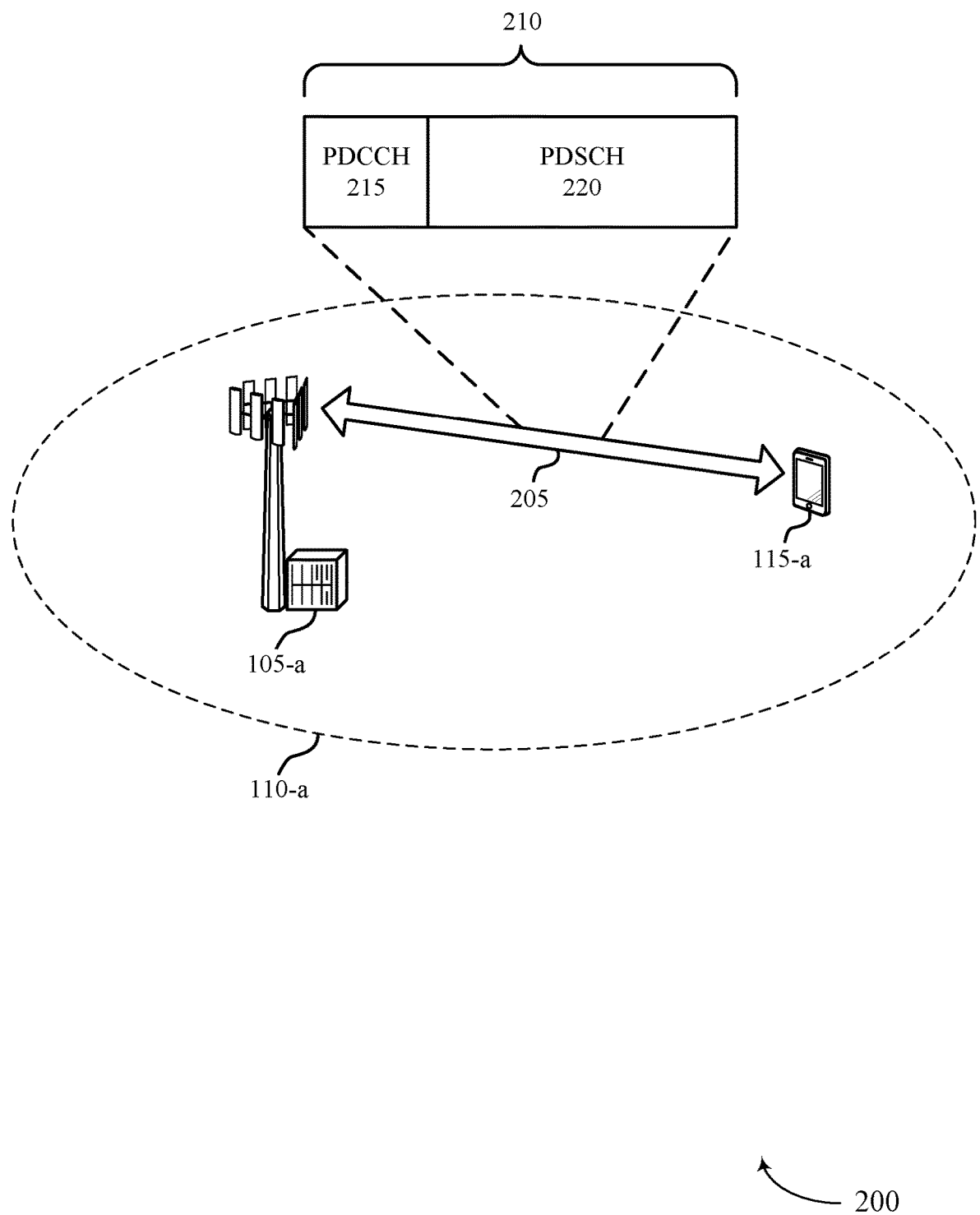

FIG. 2 illustrates an example of wireless communications system 200 that supports symbol mapping for a downlink control channel in accordance with various aspects of the present disclosure. Wireless communications system 200 includes base station 105-a and UE 115-a, which may be examples of the corresponding devices described with reference to FIG. 1. Base station 105-a may communicate with UEs 115 (including UE 115-a) within coverage area 110-a. For example, base station 105-a may communicate with UE 115-a on resources of a carrier 205. In the example of FIG. 2, base station 105-a may communicate with UE 115-a during an sTTI 210 on resources of a carrier 205. Base station 105-a may transmit control information to UE 115-a in a PDCCH 215 in the sTTI 210, and base station 105-a may transmit data to UE 115-a in PDSCH 220 in the sTTI 210. In wireless communications system 200, various aggregation levels may be supported such that base station 105-a may be able to transmit control information to a UE 115 in a search space using a wide range of aggregation levels. In addition, the different aggregation levels may be nested such that sCCEs of a lower aggregation level may be included in sCCEs of a higher aggregation level.

Figure 3:
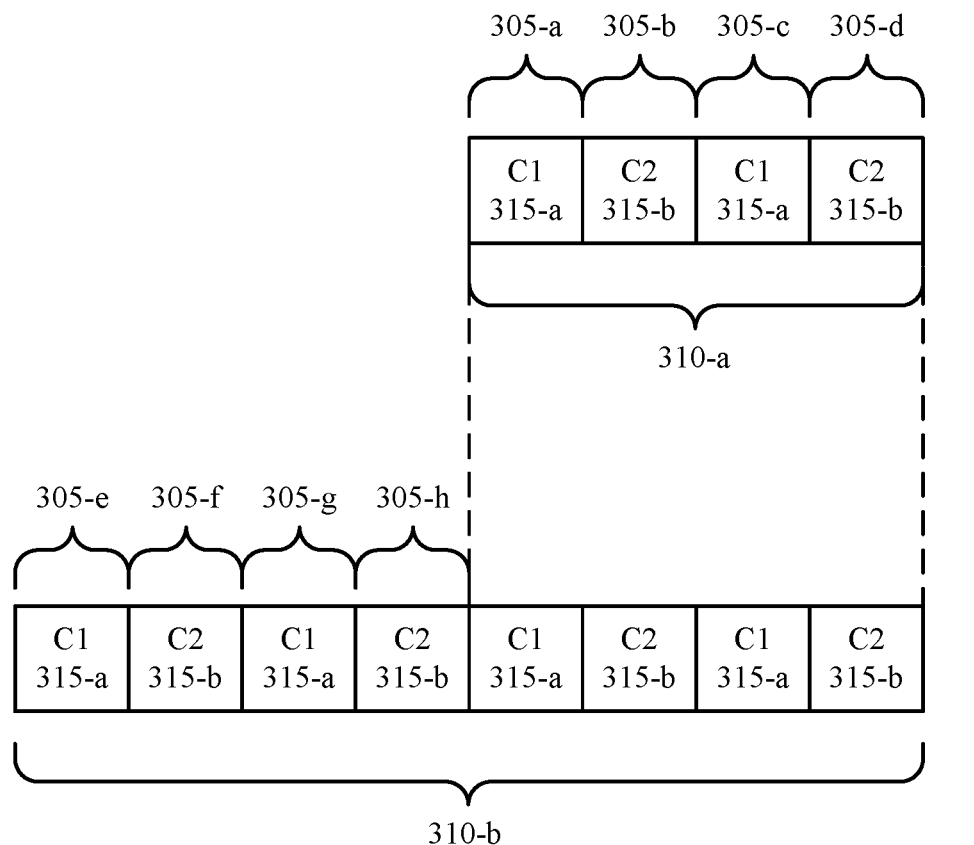
FIG. 3 illustrates an example of nested aggregation levels in accordance with aspects of the present disclosure.

FIG. 3 illustrates an example of nested aggregation levels 300 in accordance with various aspects of the present disclosure. In the example of FIG. 3, base station 105-a may transmit a control channel on a set of sCCEs 305 (e.g., four sCCEs) using an aggregation level 310-a (e.g., an aggregation level of four). In this example, each sCCE may include 36 REs, and the payload of the control channel to be transmitted to UE 115-a may be 48 bits. Base station 105-a may be configured to transmit the payload using a code rate of 1/3. Thus, the number of bits to be transmitted in the control channel may be equal to 144. Because each sCCE may include 36 REs, and the base station 105-a may map the payload to the REs using quadrature phase shift keying (QPSK), each sCCE may be capable of carrying 72 bits. As such, the 144-bit payload may be mapped to two sCCEs 305. That is, the modulated control symbols may be mapped to two sCCEs 305.

In particular, a first set of modulated control symbols 315-a may be mapped to a first sCCE 305-a and a second set of modulated control symbols 315-b may be mapped to a second sCCE 305-b. The first set of modulated control symbols 315-a may then be repeated in sCCE 305-c and the second set of modulated control symbols 315-b may be repeated in sCCE 305-d (e.g., based on using a circular buffer to map the modulated control symbols to the sCCEs 305). In this example, however, if modulated control symbols are mapped to sCCEs 305-a to 305-h for aggregation level 310-b using the same techniques used to map the modulated control symbols to sCCEs 305-a to 305-d for aggregation level 310-a, then sCCEs 305-a to 305-d may include the same set of modulated control symbols 315 regardless of whether a control channel is transmitted using aggregation level 310-a or 310-b (as shown). Alternatively, even if the modulated control symbols in each sCCE 305 were not identical for different aggregation levels, the order of the modulated control symbols in the sCCEs 305 would be the same.

Accordingly, although base station 105-a may transmit the control information using aggregation level 310-a (e.g., an aggregation level of four), UE 115-a may erroneously identify signals in sCCEs 305-e through 305-h as control information, and UE 115-a may not be able to correctly identify the control information intended for UE 115-a. In another example, base station 105-a may transmit the control information using aggregation level 310-b (e.g., an aggregation level of eight), but UE 115-a may erroneously identify the control information in sCCEs 305-a through 305-d as all of the control information transmitted by base station 105-a. Accordingly, UE 115-a may not correctly identify all of the control information transmitted by base station 105-a (e.g., in sCCEs 305-e through 305-h). As a result, UE 115-a may not be able to identify the PDSCH 220 grant in the control information from base station 105-a, and UE 115-a may not be able to receive data on the PDSCH 220 from base station 105-a. Further, because data transmitted in the PDSCH 220 may be rate matched around control information transmitted in PDCCH 215, UE 115-a may not be able to correctly identify the resources used to transmit data in PDSCH 220, which may result in reduced throughput in a wireless communications system.

Wireless communications system 200 may support efficient techniques for mapping modulated control symbols to sCCEs differently for different aggregation levels such that UE 115-a may be able to correctly identify the control channel transmitted by base station 105-a using a particular aggregation level. In some aspects, for a first aggregation level, base station 105-a may map the modulated control symbols to sREGs or REs within one or more sCCEs in the order in which they were generated (e.g., resulting in an in-order mapping of the modulated control symbols to sequential sREGs or REs). However, for other aggregation levels (e.g., aggregation levels greater than one), base station 105-a may map the modulated control symbols to sREGs or REs in a different order from the order in which the modulated control symbols were generated (e.g., out-of-order mapping). That is, base station 105-a may map the modulated symbols to out-of-order sREGs or REs (e.g., not in increasing order). Because the indices of the sREGs may be assigned in a frequency-first time-second manner (as described with reference to FIG. 1), the modulated control symbols may be mapped to sREGs in a first symbol before being mapped to sREGs in a second symbol.

In some cases, base station 105-a may interleave the modulated control symbols mapped to sREGs or REs based on an aggregation level used to transmit the modulated control symbols. In one example, base station 105-a may interleave the modulated control symbols prior to mapping the modulated control symbols to REGs or REs based on the aggregation level. Base station 105-a may then map the interleaved modulated control symbols to sREGs or REs from the lowest sREG or RE index to the highest sREG or RE index (e.g., resulting in an out-of-order mapping of the modulated control symbols to sequential REGs or REs). In another example, base station 105-a may map the modulated control symbols (e.g., in the order in which they were generated) to interleaved sREGs or REs (e.g., resulting in an out-of-order mapping of the modulated control symbols to sequential REGs or REs). Accordingly, if UE 115-a attempts to decode a control channel transmitted using a particular aggregation level based on an assumption that the control channel was transmitted using another aggregation level, the UE 115-a would not be able to successfully decode the control channel.

FIG. 4 illustrates an example table 400 showing the order in which modulated control symbols may be mapped to sREGs for different aggregation levels in accordance with various aspects of the present disclosure. For a first aggregation level (i.e., AL 1), the modulated control symbols may be mapped to four sREGs (i.e., one sCCE) in order of increasing sREG index: {0, 1, 2, 3}. For a second aggregation level (i.e., AL 2), the modulated control symbols may be mapped to sREGs based on the following order of sREG index: {0, 2, 4, 6, 1, 3, 5, 7}. For a third aggregation level (i.e., AL 3), the modulated control symbols may be mapped to sREGs based on the following order of sREG index: {0, 2, 4, 6, 8, 10, 12, 14, 1, 3, 5, 7, 9, 11, 13, 15}. For a fourth aggregation level (i.e., AL 4), the modulated control symbols may be mapped to sREGs based on the following order of sREG index: {0, 2, 4, 6, 8, 10, 12, 14, 16, 18, 20, 22, 24, 26, 28, 30, 1, 3, 5, 7, 9, 11, 13, 15, 17, 19, 21, 23, 25, 27, 29, 31}. Although FIG. 4 describes techniques for mapping modulated control symbols to sREGs for different aggregation levels, it is to be understood that similar techniques may be used to map modulated control symbols to REs for different aggregation levels.

In some cases, as discussed with reference to FIG. 3, the sREGs to be used for a control information transmission may first be interleaved, and modulated control symbols may then be mapped to the interleaved sREGs. In such cases, to facilitate the mappings described with reference to FIG. 4, the sREGs may be interleaved using a block interleaver. In particular, the indices of sREGs may be loaded into a matrix row by row, and modulated control symbols may be mapped to sREGs read out from the matrix column by column. The number of rows in the matrix may correspond to the number of sCCEs associated with an aggregation level to be used for a control information transmission, and the number of columns in the matrix may be equal to four (i.e., the number of sREGs in an sCCE). Thus, as an example, for an aggregation level of two, a first row of a matrix in a block interleaver may include sREGs with indices 0, 1, 2, and 3, and a second row of the matrix may include sREGs with indices 4, 5, 6, and 7. The sREGs may then be read out of the matrix column by column such that the indices of the sREGs are 0, 4, 1, 5, 2, 6, 3, and 7 (as illustrated in FIG. 4), and modulated control symbols may be mapped to the interleaved sREGs.

Figure 5:
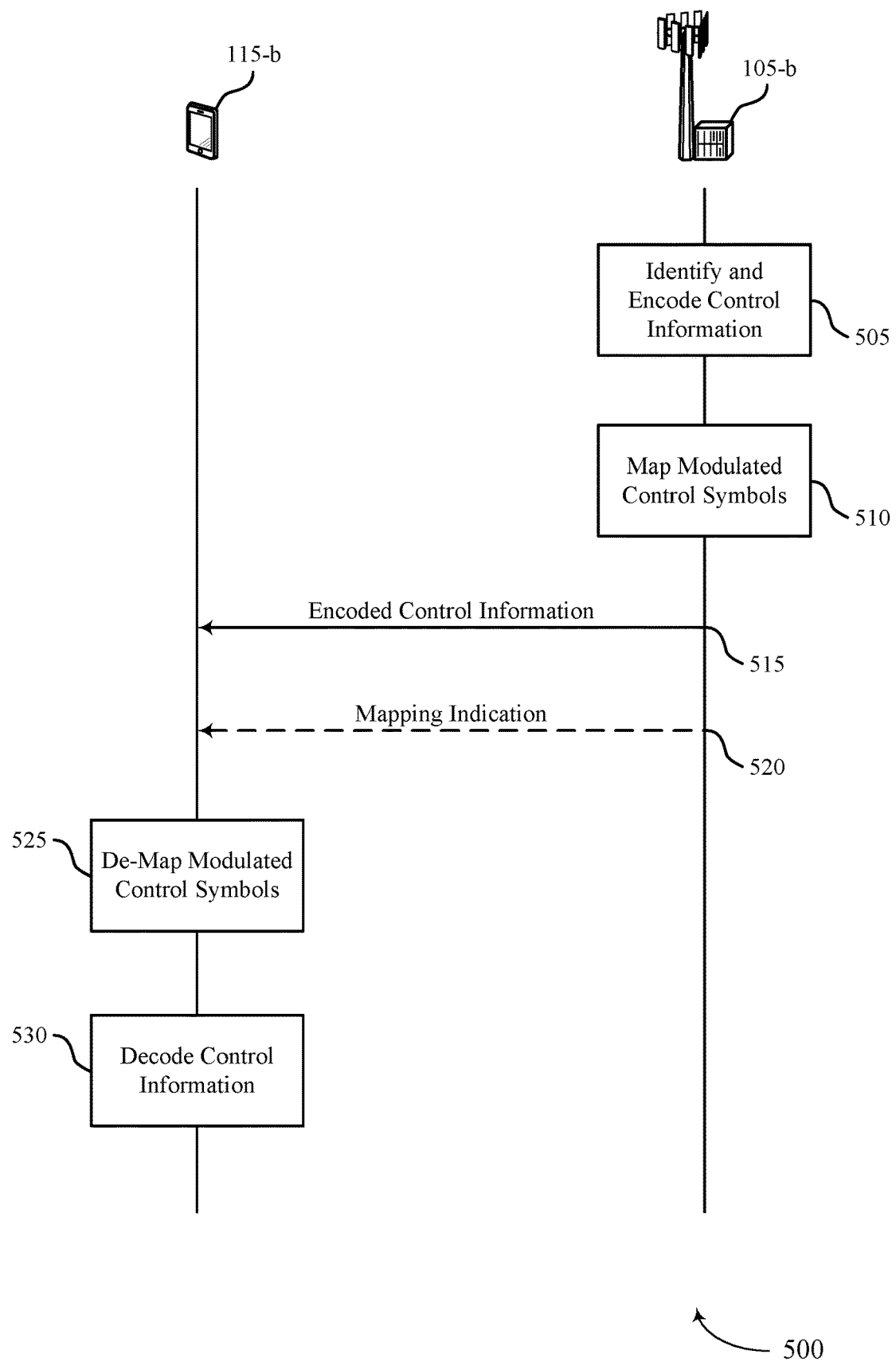
FIG. 5 illustrates an example of a process flow that supports symbol mapping for a downlink control channel in accordance with aspects of the present disclosure.

FIG. 5 illustrates an example of a process flow 500 that supports symbol mapping for a downlink control channel in accordance with various aspects of the present disclosure. Process flow 500 illustrates aspects of techniques performed by base station 105-b, which may be an example of a base station 105 described with reference to FIGS. 1-4. Process flow 500 also illustrates aspects of techniques performed by a UE 115-b, which may be an example of a UE 115 described with reference to FIGS. 1-4.

At 505, base station 105-b may identify control information for transmission on a downlink control channel, and base station 105-b may encode the control information into a plurality of modulated control symbols. In some cases, the downlink control channel is a CRS-based downlink control channel that includes consecutive sREGs in each CCE. At 510, base station 105-b may map the plurality of modulated control symbols to available resources of an aggregation level candidate on the downlink control channel, where the mapping differs based on an aggregation level associated with the downlink channel. In some examples, an aggregation level candidate (e.g., control channel candidate) may correspond to a group or number of CCEs in a search space associated with an aggregation level that may be used for transmissions in the search space, and the aggregation level associated with the downlink channel may correspond to the number of CCEs on which the downlink channel is transmitted. In some cases, base station 105-*b* may interleave the plurality of modulated control symbols prior to the mapping of the plurality of modulated control symbols. Base station 105-*b* may then map the interleaved plurality of modulated control symbols to the available resources one-by-one from a lowest RE index to a highest RE index.

In some cases, base station 105-*b* may map the plurality of modulated control symbols out-of-order to the available resources (e.g., a plurality of sREG indices) of the aggregation level candidate for an aggregation level greater than one (e.g., such that the sREG indices are interleaved). In such cases, the different out-of-order mappings are used for different aggregation levels greater than one. Alternatively, base station 105-*b* may map the plurality of modulated control symbols in order to the available resources of the aggregation level candidate for an aggregation level of one.

At 515, base station 105-*b* may then transmit the encoded control information on the downlink control channel to UE 115-*b*. In some cases, at 520, base station 105-*b* may also transmit an indication (e.g., via radio resource control (RRC) signaling) of the mapping of the plurality of modulated control symbols to the available resources (e.g., an indication of different mappings associated with different aggregation levels). UE 115-*b* may receive the modulated control symbols interleaved over resources of an aggregation level candidate on the downlink control channel, or UE 115-*b* may receive the modulated control symbols over interleaved resources of an aggregation level candidate on the downlink control channel. At 525, UE 115-*b* may de-map (or de-interleave) the plurality of modulated control symbols based on an aggregation level associated with the downlink control channel, or UE 115-*b* may de-map (or de-interleave) the resources based on an aggregation level associated with the downlink control channel. At 530, UE 115-*b* may then decode the plurality of modulated control symbols into control information.

In some cases, prior to identifying a PDCCH, the UE 115-*b* may test multiple aggregation level candidates or PDCCH candidates (e.g., as part of a blind decoding procedure) by attempting to de-map and decode modulated symbols corresponding to an aggregation level candidate or PDCCH candidate based on the aggregation level of the aggregation level candidate or PDCCH candidate. In such cases, if the UE 115-*b* fails to successfully de-map and decode a PDCCH in an aggregation level candidate or a PDCCH candidate, the UE 115-*b* may continue to test other aggregation level candidates or PDCCH candidates for the PDCCH until the UE 115-*b* de-maps and decodes the modulated control symbols of the PDCCH. That is, the UE 115-*b* may continue a blind decoding procedure until the UE 115-*b* performs de-mapping on an aggregation level candidate that includes the PDCCH (e.g., based on an aggregation level associated with the aggregation level candidate or associated with the PDCCH) and the UE 115-*b* correctly decodes the modulated control symbols of the PDCCH.

Figure 6:
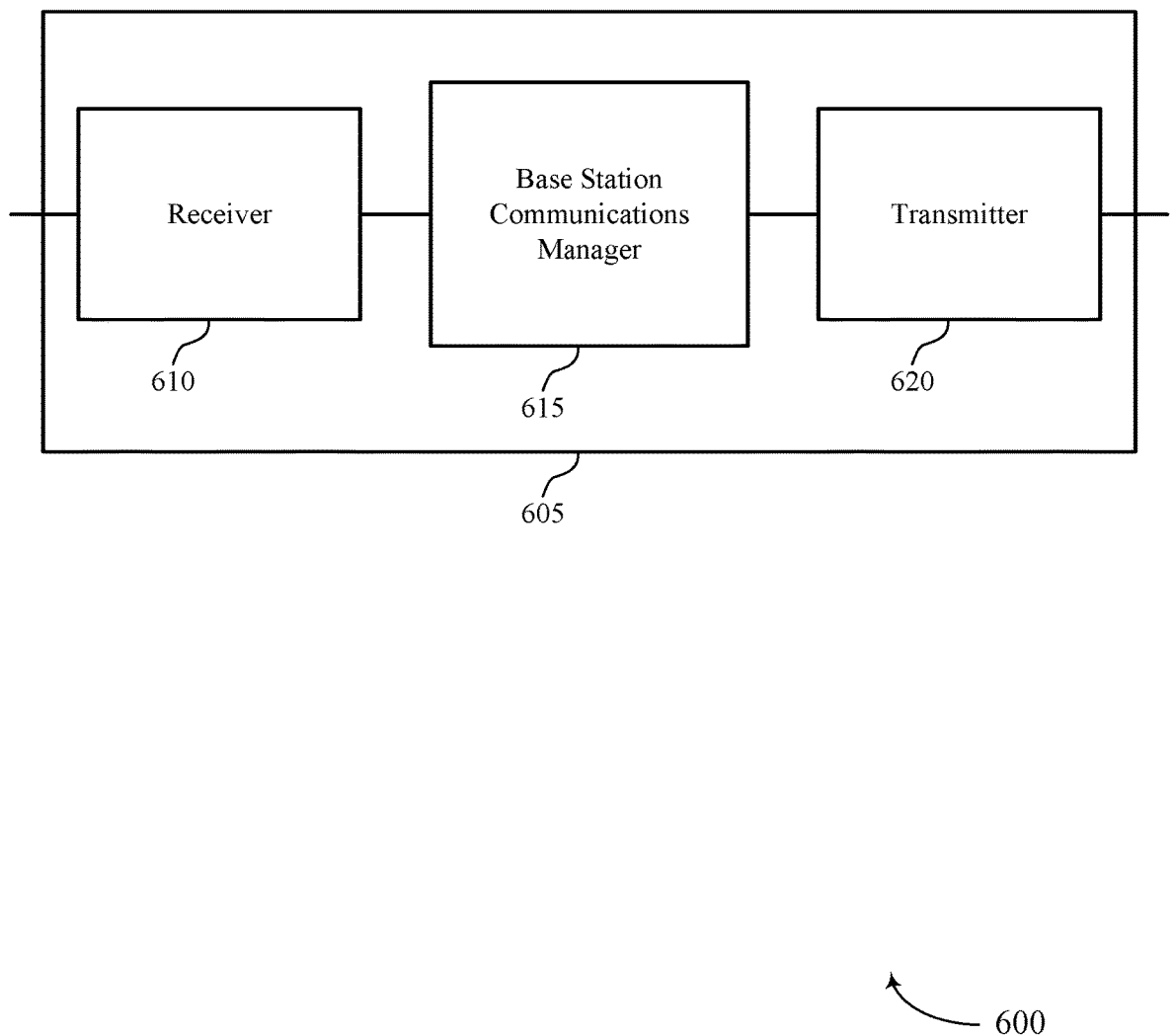
FIGS. 6-8 show block diagrams of a device that supports symbol mapping for a downlink control channel in accordance with aspects of the present disclosure.

FIG. 6 shows a block diagram 600 of a wireless device 605 that supports symbol mapping for a downlink control channel in accordance with aspects of the present disclosure. Wireless device 605 may be an example of aspects of a base station 105 as described herein. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to symbol mapping for a downlink control channel, etc.). Information may be passed on to other components of the device. The receiver 610 may be an example of aspects of the transceiver 935 described with reference to FIG. 9. The receiver 610 may utilize a single antenna or a set of antennas.

Base station communications manager 615 may be an example of aspects of the base station communications manager 915 described with reference to FIG. 9. Base station communications manager 615 and/or at least some of its various sub-components may be implemented in hardware, software executed by a processor, firmware, or any combination thereof. If implemented in software executed by a processor, the functions of the base station communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station communications manager 615 and/or at least some of its various sub-components may be physically located at various positions, including being distributed such that portions of functions are implemented at different physical locations by one or more physical devices. In some examples, base station communications manager 615 and/or at least some of its various sub-components may be a separate and distinct component in accordance with various aspects of the present disclosure. In other examples, base station communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 615 may identify control information for transmission on a downlink control channel, encode the control information into a set of modulated control symbols, and map the set of modulated control symbols to available resources of an aggregation level candidate on the downlink control channel, where the mapping differs based on an aggregation level associated with the downlink control channel. Base station communications manager 615 may then coordinate with transmitter 620 to transmit the encoded control information on the downlink control channel and transmit an indication of the mapping of the set of modulated control symbols to the available resources.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
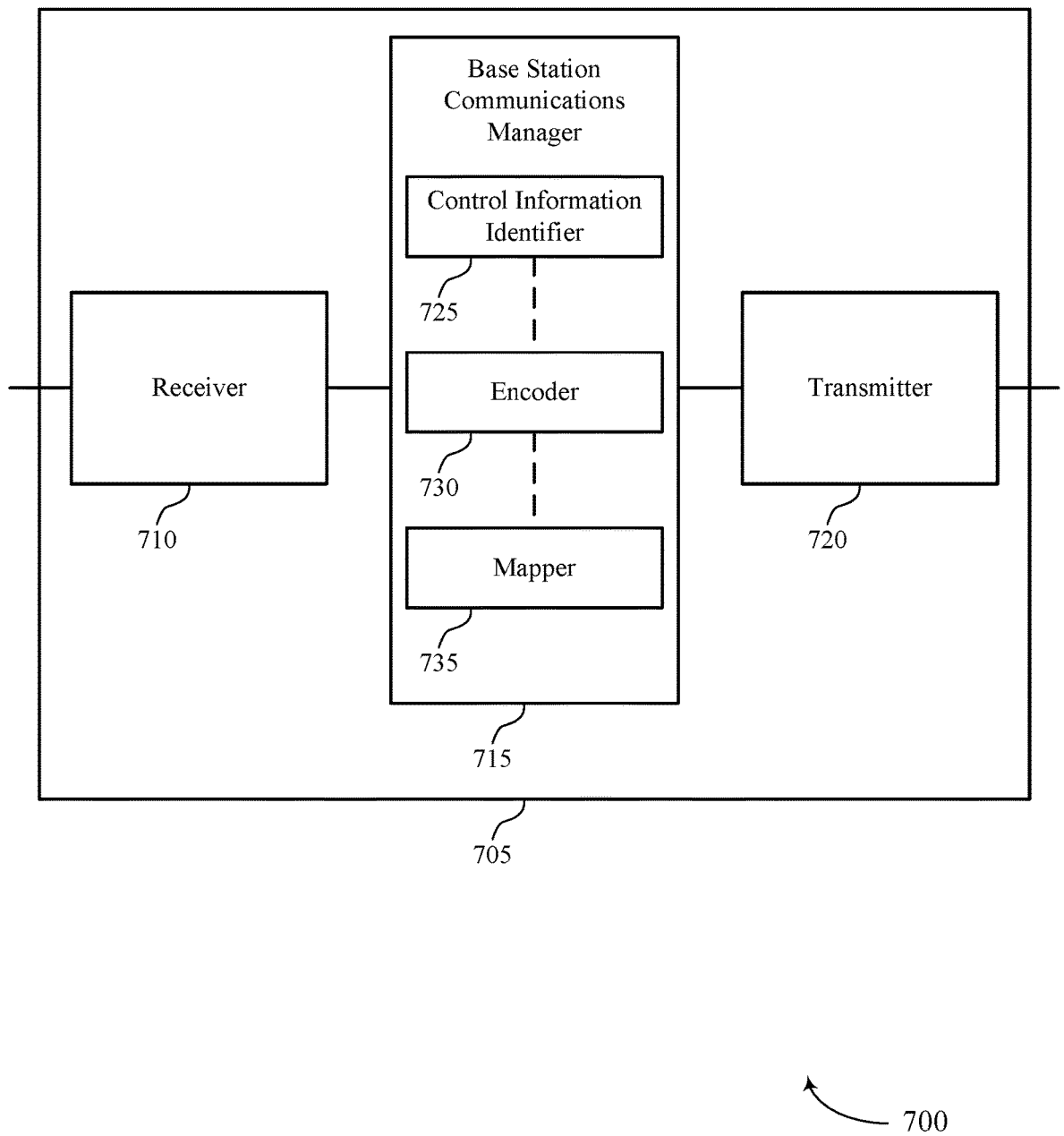

FIG. 7 shows a block diagram 700 of a wireless device 705 that supports symbol mapping for a downlink control channel in accordance with aspects of the present disclosure. Wireless device 705 may be an example of aspects of a wireless device 605 or a base station 105 as described with reference to FIG. 6. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to symbol mapping for a downlink control channel, etc.). Information may be passed on to other components of the device. The receiver 710 may be an example of aspects of the transceiver 935 described with reference to FIG. 9. The receiver 710 may utilize a single antenna or a set of antennas.

Base station communications manager 715 may be an example of aspects of the base station communications manager 915 described with reference to FIG. 9. Base station communications manager 715 may include control information identifier 725, encoder 730, and mapper 735.

Control information identifier 725 may identify control information for transmission on a downlink control channel. In some cases, the downlink control channel is a CRS-based downlink control channel that includes consecutive REGs in each CCE. Encoder 730 may encode the control information into a set of modulated control symbols. Mapper 735 may map the set of modulated control symbols to available resources of an aggregation level candidate on the downlink control channel, where the mapping differs based on an aggregation level associated with the downlink control channel.

In some cases, different out-of-order mappings are used for different aggregation levels greater than one. In some cases, mapping the set of modulated control symbols to the available resources includes mapping the interleaved set of modulated control symbols to the available resources one-by-one from a lowest RE index to a highest RE index. In some cases, mapping the set of modulated control symbols to the available resources includes mapping out-of-order the set of modulated control symbols to a set of REG indices or RE indices such that the REG indices or the RE indices are interleaved. In some cases, mapping the set of modulated control symbols includes mapping in order the set of modulated control symbols to the available resources of the aggregation level candidate for an aggregation level of one. In some cases, mapping the set of modulated control symbols includes mapping out-of-order the set of modulated control symbols to the available resources of the aggregation level candidate for an aggregation level greater than one.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
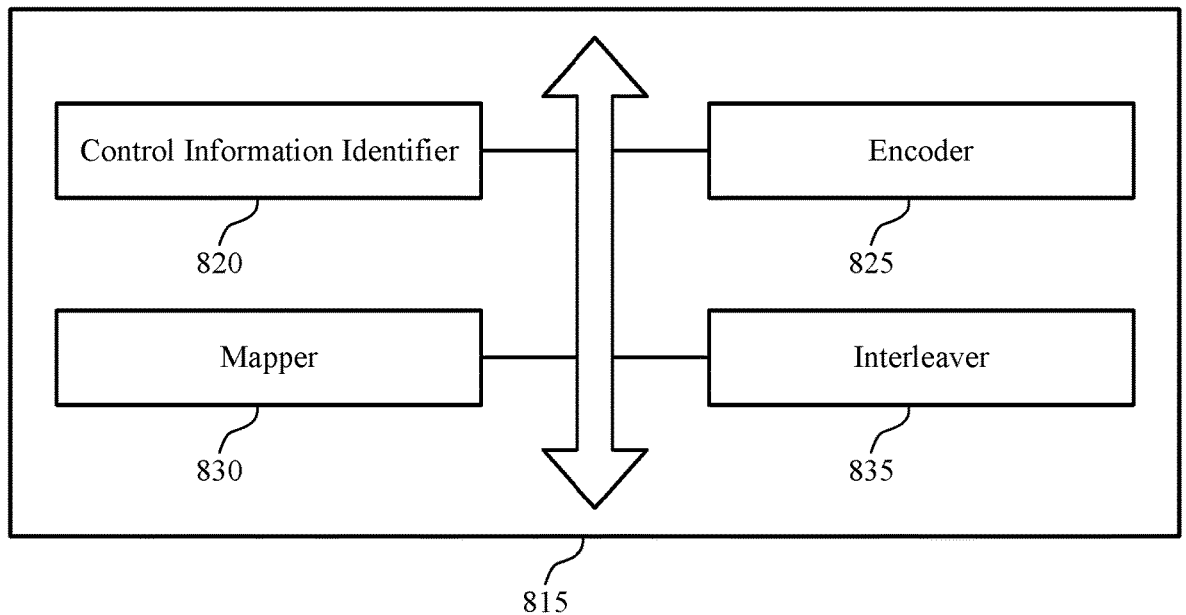

FIG. 8 shows a block diagram 800 of a base station communications manager 815 that supports symbol mapping for a downlink control channel in accordance with aspects of the present disclosure. The base station communications manager 815 may be an example of aspects of a base station communications manager 615, a base station communications manager 715, or a base station communications manager 915 described with reference to FIGS. 6, 7, and 9. The base station communications manager 815 may include control information identifier 820, encoder 825, mapper 830, and interleaver 835. Each of these modules may communicate, directly or indirectly, with one another (e.g., via one or more buses).

Control information identifier 820 may identify control information for transmission on a downlink control channel. In some cases, the downlink control channel is a CRS-based downlink control channel that includes consecutive REGs in each CCE. Encoder 825 may encode the control information into a set of modulated control symbols. Mapper 830 may map the set of modulated control symbols to available resources of an aggregation level candidate on the downlink control channel, where the mapping differs based on an aggregation level associated with the downlink control channel. In some cases, interleaver 835 may interleave the set of modulated control symbols prior to the mapping of the set of modulated control symbols or interleave the resources prior to the mapping of the set of modulated control symbols. Interleaver 835 may be an example of a block interleaver.

In some cases, different out-of-order mappings are used for different aggregation levels greater than one. In some cases, mapping the set of modulated control symbols to the available resources includes mapping the interleaved set of modulated control symbols to the available resources one-by-one from a lowest RE index to a highest RE index. In some cases, mapping the set of modulated control symbols to the available resources includes mapping out-of-order the set of modulated control symbols to a set of REG indices or RE indices such that the REG indices or the RE indices are interleaved. In some cases, mapping the set of modulated control symbols includes mapping in order the set of modulated control symbols to the available resources of the aggregation level candidate for an aggregation level of one. In some cases, mapping the set of modulated control symbols includes mapping out-of-order the set of modulated control symbols to the available resources of the aggregation level candidate for an aggregation level greater than one.

Figure 9:
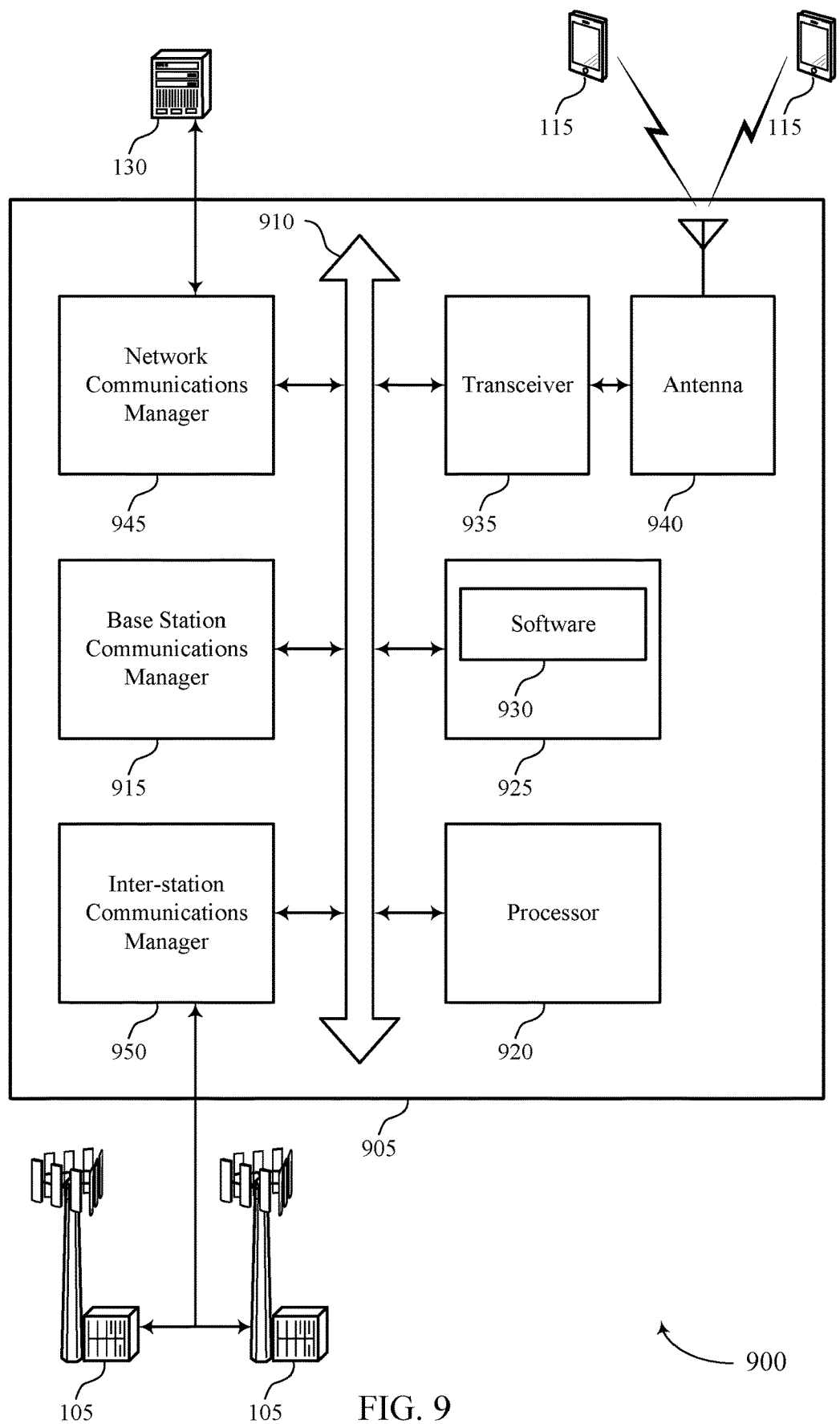
FIG. 9 illustrates a block diagram of a system including a base station that supports symbol mapping for a downlink control channel in accordance with aspects of the present disclosure.

FIG. 9 shows a diagram of a system 900 including a device 905 that supports symbol mapping for a downlink control channel in accordance with aspects of the present disclosure. Device 905 may be an example of or include the components of wireless device 605, wireless device 705, or a base station 105 as described above, e.g., with reference to FIGS. 6 and 7. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting symbol mapping for a downlink control channel).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support symbol mapping for a downlink control channel. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an LTE/LTE-A wireless communication network technology to provide communication between base stations 105.

Figure 10:
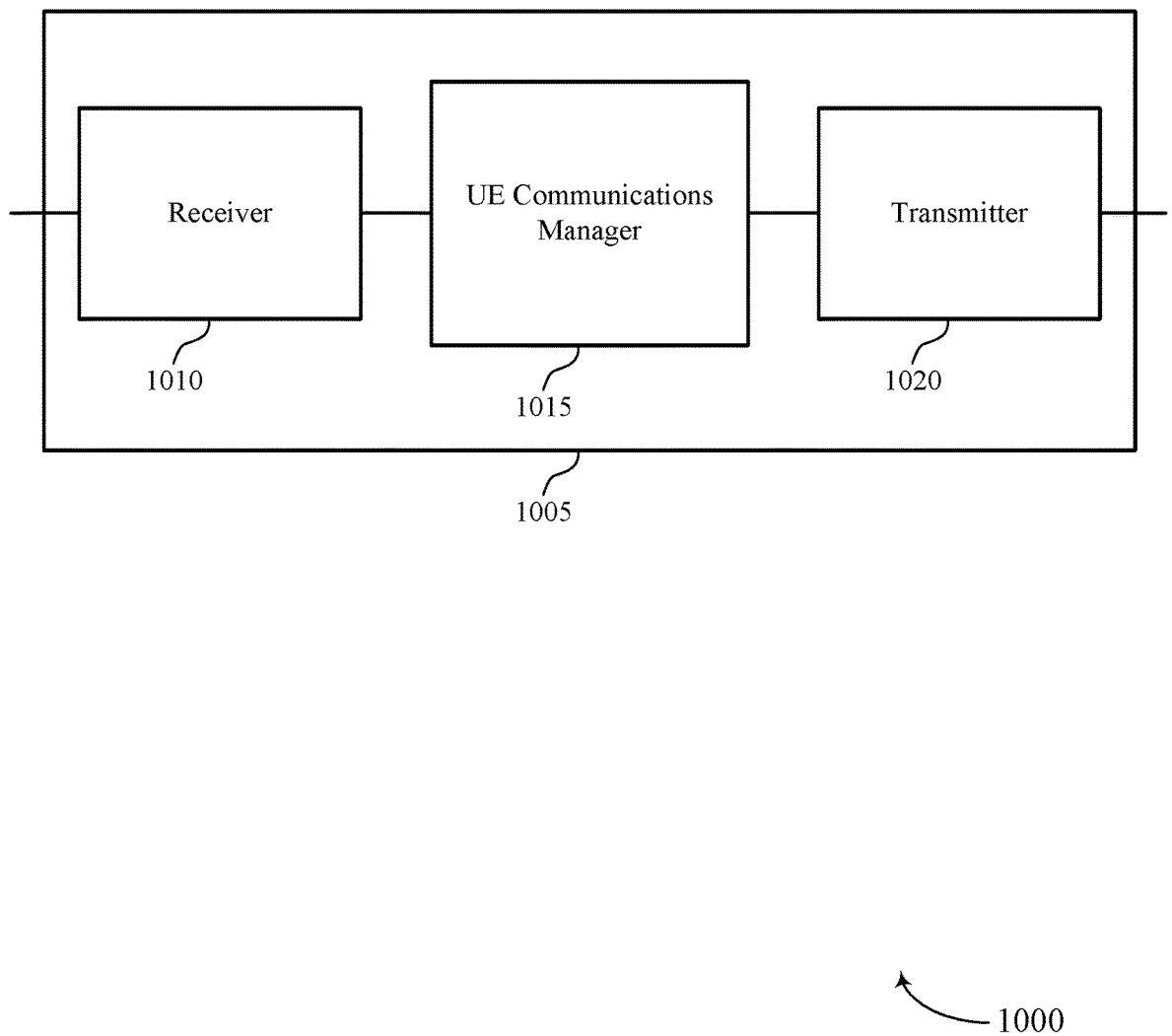
FIGS. 10 and 11 show block diagrams of a device that supports symbol mapping for a downlink control channel in accordance with aspects of the present disclosure.

FIG. 10 shows a block diagram 1000 of a wireless device 1005 that supports symbol mapping for a downlink control channel in accordance with aspects of the present disclosure. Wireless device 1005 may be an example of aspects of a UE 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to symbol mapping for a downlink control channel, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may receive a set of modulated control symbols interleaved over resources of an aggregation level candidate on a downlink control channel, de-interleave the set of modulated control symbols based on an aggregation level associated with the downlink control channel, and decode the set of modulated control symbols into control information. The UE communications manager 1015 may also receive a set of modulated control symbols over interleaved resources of an aggregation level candidate on a downlink control channel, de-interleave the resources based on an aggregation level associated with the downlink control channel, and decode the set of modulated control symbols into control information.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
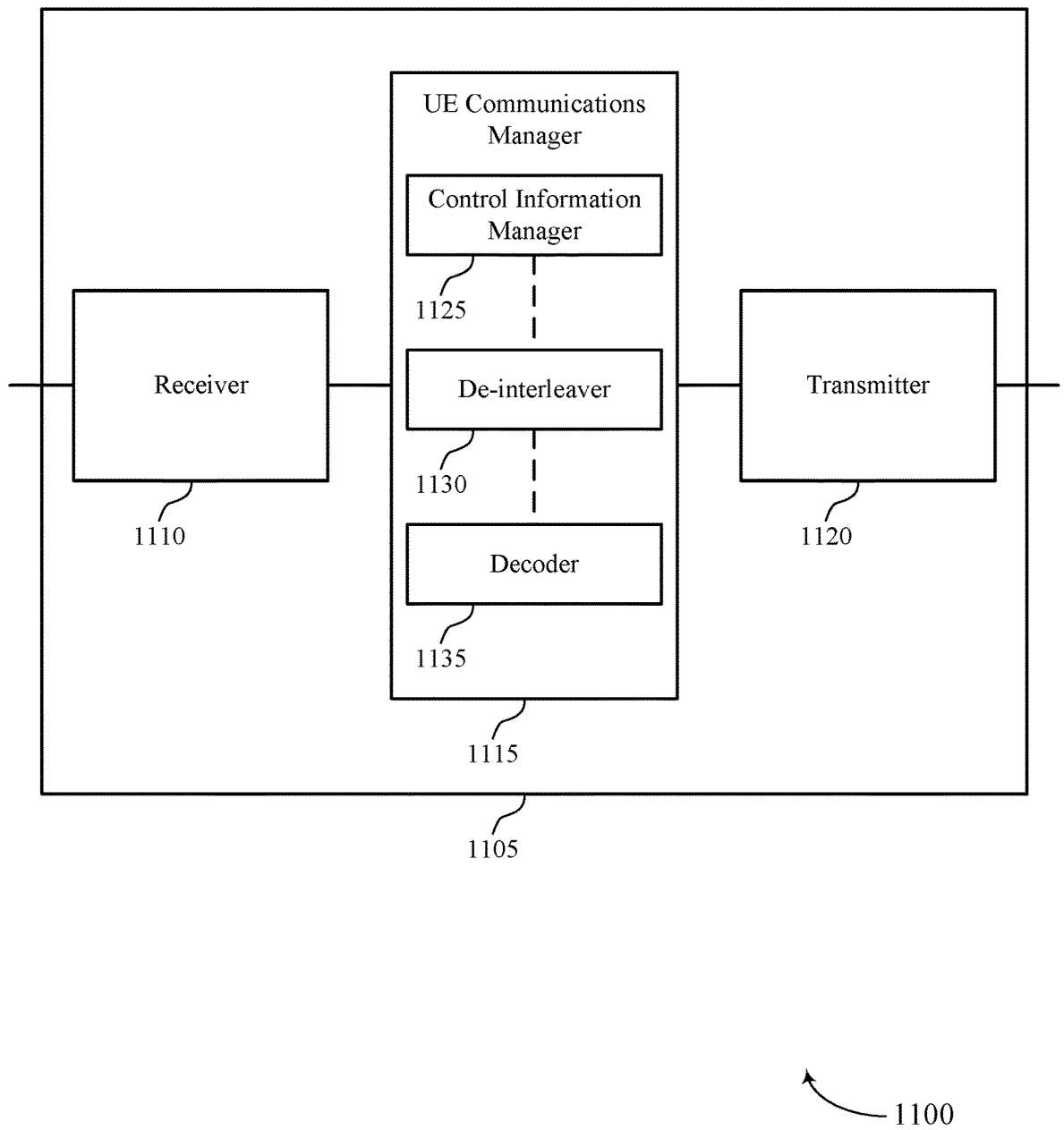

FIG. 11 shows a block diagram 1100 of a wireless device 1105 that supports symbol mapping for a downlink control channel in accordance with aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to symbol mapping for a downlink control channel, etc.). Information may be passed on to other components of the device. The receiver 1110 may be an example of aspects of the transceiver 1235 described with reference to FIG. 12. The receiver 1110 may utilize a single antenna or a set of antennas.

UE communications manager 1115 may be an example of aspects of the UE communications manager 1215 described with reference to FIG. 12. UE communications manager 1115 may include control information manager 1125, de-interleaver 1130, and decoder 1135. De-interleaver 1130 may be an example of a block de-interleaver.

Control information manager 1125 may receive a set of modulated control symbols interleaved over resources of an aggregation level candidate on a downlink control channel. De-interleaver 1130 may de-interleave the set of modulated control symbols based on an aggregation level associated with the downlink control channel. In some cases, de-interleaver 1130 may receive an indication of the interleaving of the resources. Decoder 1135 may decode the set of modulated control symbols into control information. In some cases, the aggregation level associated with the downlink control channel is greater than one. In some cases, the downlink control channel is a CRS-based downlink control channel that includes consecutive REGs in each CCE. In some cases, the resources include a set of REs or REGs, the set of modulated control symbols being interleaved over the set of REs or REGs.

Control information manager 1125 may also receive a set of modulated control symbols over interleaved resources of an aggregation level candidate on a downlink control channel. De-interleaver 1130 may de-interleave the resources based on an aggregation level associated with the downlink control channel. In some cases, de-interleaver 1130 may receive an indication of the interleaving of the set of modulated control symbols over the resources. In some cases, the downlink control channel is a CRS-based downlink control channel that includes consecutive REGs in each CCE. In some cases, the resources include a set of interleaved REGs or REs. In some cases, the aggregation level associated with the downlink control channel is greater than one.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1235 described with reference to FIG. 12. The transmitter 1120 may utilize a single antenna or a set of antennas.

Figure 12:
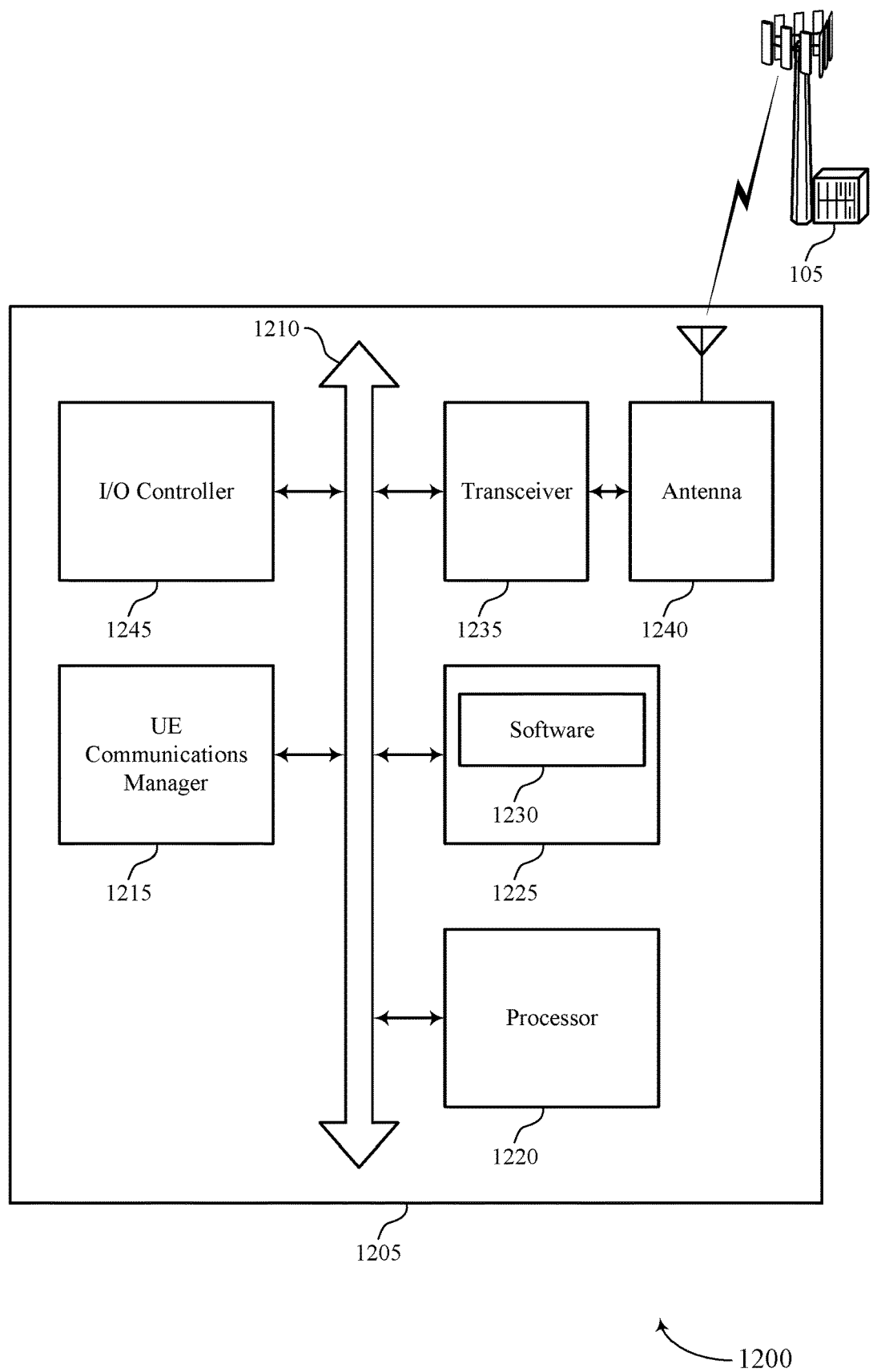
FIG. 12 illustrates a block diagram of a system including a user equipment (UE) that supports symbol mapping for a downlink control channel in accordance with aspects of the present disclosure.

FIG. 12 shows a diagram of a system 1200 including a device 1205 that supports symbol mapping for a downlink control channel in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting symbol mapping for a downlink control channel).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support symbol mapping for a downlink control channel. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
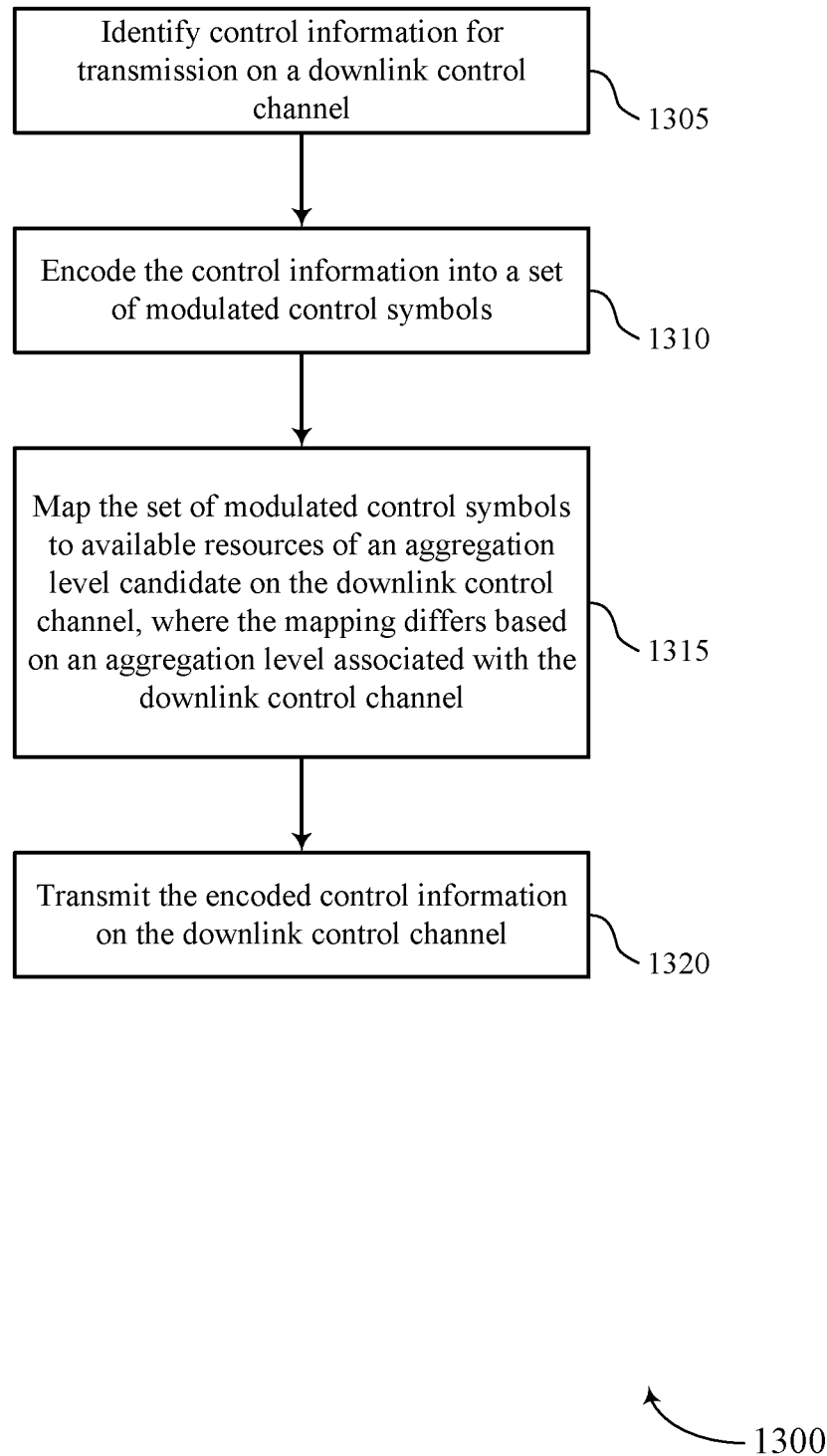
FIGS. 13-15 illustrate methods for symbol mapping for a downlink control channel in accordance with aspects of the present disclosure.

FIG. 13 shows a flowchart illustrating a method 1300 for symbol mapping for a downlink control channel in accordance with aspects of the present disclosure. The operations of method 1300 may be implemented by a base station 105 or its components as described herein. For example, the operations of method 1300 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At 1305 the base station 105 may identify control information for transmission on a downlink control channel. The operations of 1305 may be performed according to the methods described herein. In certain examples, aspects of the operations of 1305 may be performed by a control information identifier as described with reference to FIGS. 6 through 9.

At 1310 the base station 105 may encode the control information into a plurality of modulated control symbols. The operations of 1310 may be performed according to the methods described herein. In certain examples, aspects of the operations of 1310 may be performed by a encoder as described with reference to FIGS. 6 through 9.

At 1315 the base station 105 may map the plurality of modulated control symbols to available resources of an aggregation level candidate on the downlink control channel, wherein the mapping differs based at least in part on an aggregation level associated with the downlink control channel. The operations of 1315 may be performed according to the methods described herein. In certain examples, aspects of the operations of 1315 may be performed by a mapper as described with reference to FIGS. 6 through 9.

At 1320 the base station 105 may transmit the encoded control information on the downlink control channel. The operations of 1320 may be performed according to the methods described herein. In certain examples, aspects of the operations of 1320 may be performed by a transmitter as described with reference to FIGS. 6 through 9.

Figure 14:
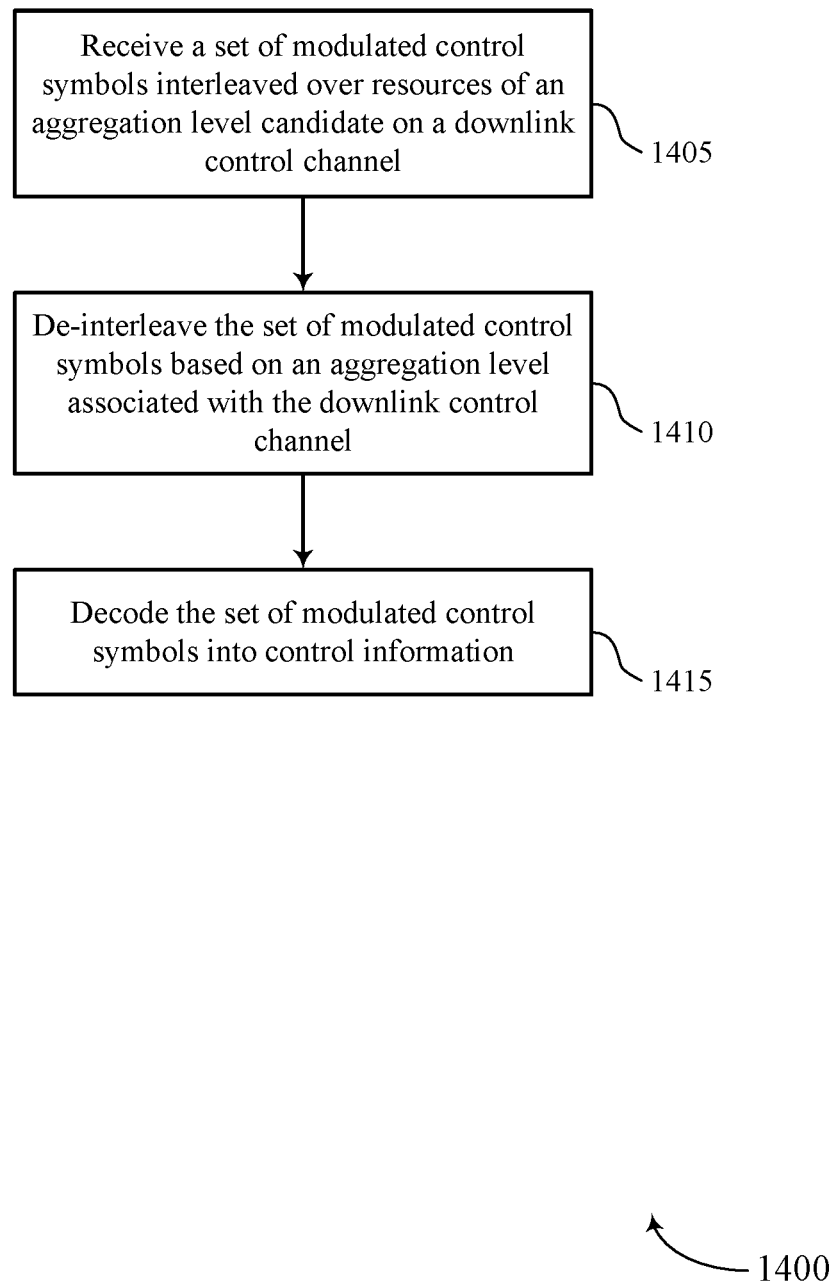

FIG. 14 shows a flowchart illustrating a method 1400 for symbol mapping for a downlink control channel in accordance with aspects of the present disclosure. The operations of method 1400 may be implemented by a UE 115 or its components as described herein. For example, the operations of method 1400 may be performed by a UE communications manager as described with reference to FIGS. 10 through 12. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive a plurality of modulated control symbols interleaved over resources of an aggregation level candidate on a downlink control channel. The operations of 1405 may be performed according to the methods described herein. In certain examples, aspects of the operations of 1405 may be performed by a control information manager as described with reference to FIGS. 10 through 12.

At 1410 the UE 115 may de-interleave the plurality of modulated control symbols based at least in part on an aggregation level associated with the downlink control channel. The operations of 1410 may be performed according to the methods described herein. In certain examples, aspects of the operations of 1410 may be performed by a de-interleaver as described with reference to FIGS. 10 through 12.

At 1415 the UE 115 may decode the plurality of modulated control symbols into control information. The operations of 1415 may be performed according to the methods described herein. In certain examples, aspects of the operations of 1415 may be performed by a decoder as described with reference to FIGS. 10 through 12.

Figure 15:
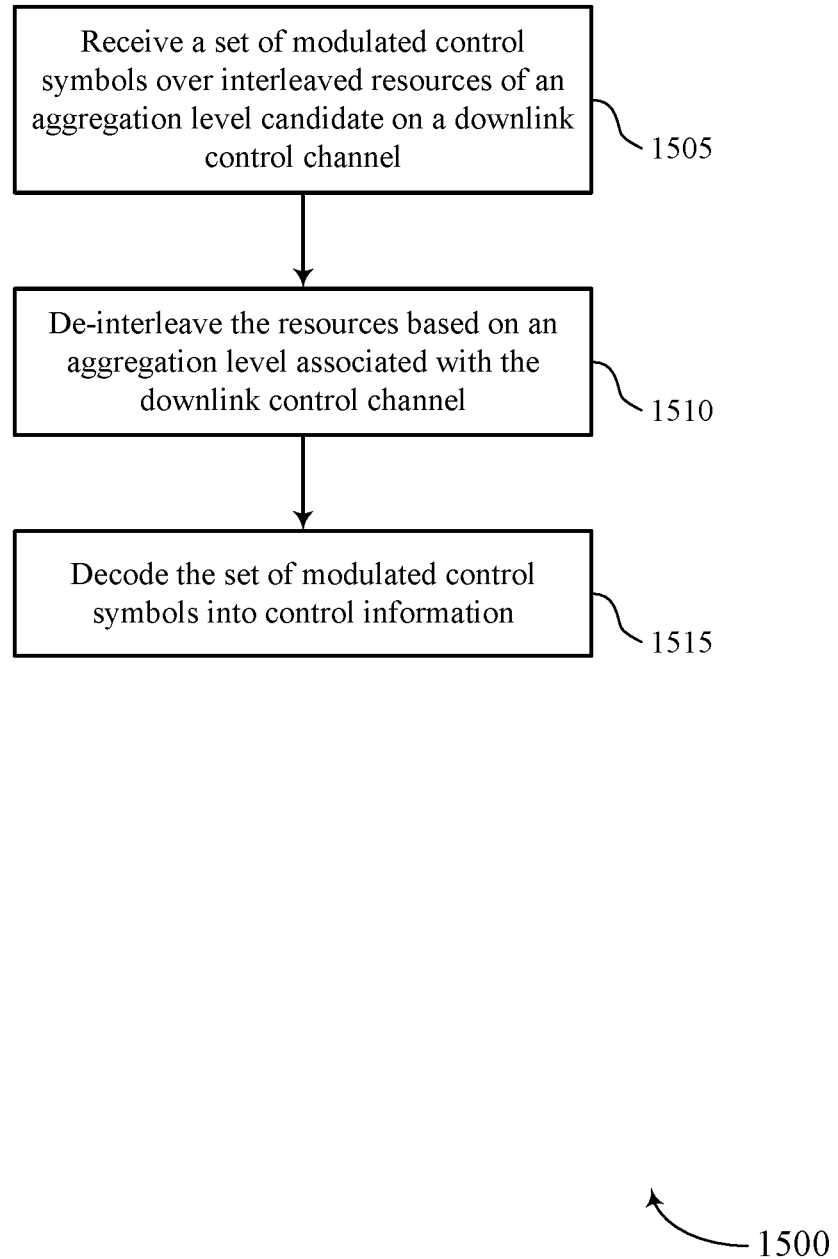

FIG. 15 shows a flowchart illustrating a method 1500 for symbol mapping for a downlink control channel in accordance with aspects of the present disclosure. The operations of method 1500 may be implemented by a UE 115 or its components as described herein. For example, the operations of method 1500 may be performed by a UE communications manager as described with reference to FIGS. 10 through 12. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive a plurality of modulated control symbols over interleaved resources of an aggregation level candidate on a downlink control channel. The operations of 1505 may be performed according to the methods described herein. In certain examples, aspects of the operations of 1505 may be performed by a control information manager as described with reference to FIGS. 10 through 12.

At 1510 the UE 115 may de-interleave the resources based at least in part on an aggregation level associated with the downlink control channel. The operations of 1510 may be performed according to the methods described herein. In certain examples, aspects of the operations of 1510 may be performed by a de-interleaver as described with reference to FIGS. 10 through 12.

At 1515 the UE 115 may decode the plurality of modulated control symbols into control information. The operations of 1515 may be performed according to the methods described herein. In certain examples, aspects of the operations of 1515 may be performed by a decoder as described with reference to FIGS. 10 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying control information for transmission on a downlink control channel;
encoding the control information into a plurality of modulated control symbols;
mapping the plurality of modulated control symbols to available resources of an aggregation level candidate on the downlink control channel, wherein the mapping comprises:
mapping a first subset of consecutive modulated control symbols of the plurality of modulated control symbols to a first set of resource element groups (REGs) of the available resources corresponding to even REG indices; and
mapping a second subset of consecutive modulated control symbols of the plurality of modulated control symbols distinct from the first subset to a second set of REGs of the available resources corresponding to odd REG indices, wherein the mapping of the first subset and the second subset is repeated based at least in part on a number of REGs in a control channel element (CCE), and wherein a number of consecutive modulated control symbols in the first subset and a number of consecutive modulated control symbols in the second subset each correspond to a number of CCEs associated with the aggregation level candidate; and
transmitting the encoded control information on the downlink control channel based at least in part on the mapped plurality of modulated control symbols.

2. The method of claim 1, further comprising:
interleaving the plurality of modulated control symbols prior to the mapping of the plurality of modulated control symbols.

3. The method of claim 2, wherein mapping the plurality of modulated control symbols to the available resources further comprises:
mapping the interleaved plurality of modulated control symbols to the available resources one-by-one from a lowest REG index to a highest REG index.

4. The method of claim 1, wherein mapping the plurality of modulated control symbols to the available resources further comprises:
mapping out-of-order the plurality of modulated control symbols to a plurality of REG indices such that the REG indices are interleaved.

5. The method of claim 1, wherein mapping the plurality of modulated control symbols further comprises:
mapping out-of-order the plurality of modulated control symbols to the available resources of the aggregation level candidate for an aggregation level greater than one.

6. The method of claim 5, wherein different out-of-order mappings are used for different aggregation levels greater than one.

7. The method of claim 1, wherein the downlink control channel is a cell-specific reference signal (CRS)-based downlink control channel that includes consecutive REGs in each CCE.

8. The method of claim 1, further comprising:
transmitting an indication of the mapping of the plurality of modulated control symbols to the available resources.

9. A method for wireless communication, comprising:
receiving a plurality of modulated control symbols over interleaved resources of an aggregation level candidate on a downlink control channel, wherein the receiving comprises:
receiving a first subset of consecutive modulated control symbols of the plurality of modulated control symbols over a first set of resource element groups (REGs) of the interleaved resources corresponding to even REG indices; and
receiving a second subset of consecutive modulated control symbols of the plurality of modulated control symbols distinct from the first subset over a second set of REGs of the interleaved resources corresponding to odd REG indices, wherein the receiving of the first subset and the second subset is repeated based at least in part on a number of REGs in a control channel element (CCE), and wherein a number of consecutive modulated control symbols in the first subset and a number of consecutive modulated control symbols in the second subset each correspond to a number of CCEs associated with the aggregation level candidate;
de-interleaving the resources based at least in part on an aggregation level associated with the downlink control channel; and
decoding the plurality of modulated control symbols into control information.

10. The method of claim 9, wherein an REG of the interleaved resources comprises one or more resource elements (REs).

11. The method of claim 9, wherein the aggregation level associated with the downlink control channel is greater than one.

12. The method of claim 9, wherein the downlink control channel is a cell-specific reference signal (CRS)-based downlink control channel that includes consecutive REGs in each CCE.

13. The method of claim 9, further comprising:
receiving an indication of the interleaving of the resources.

14. A method for wireless communication, comprising:
receiving a plurality of modulated control symbols interleaved over resources of an aggregation level candidate on a downlink control channel, wherein the receiving comprises:
receiving a first subset of consecutive modulated control symbols of the plurality of modulated control symbols over a first set of resource element groups (REGs) of the resources corresponding to even REG indices; and
receiving a second subset of consecutive modulated control symbols of the plurality of modulated control symbols distinct from the first subset over a second set of REGs of the resources corresponding to odd REG indices, wherein the receiving of the first subset and the second subset is repeated based at least in part on a number of REGs in a control channel element (CCE) and wherein a number of consecutive modulated control symbols in the first subset and a number of consecutive modulated control symbols in the second subset each correspond to a number of CCEs associated with the aggregation level candidate;

de-interleaving the plurality of modulated control symbols based at least in part on an aggregation level associated with the downlink control channel; and decoding the plurality of modulated control symbols into control information.

15. The method of claim 14, wherein an REG of the resources comprises one or more resource elements (REs).

16. The method of claim 14, wherein the aggregation level associated with the downlink control channel is greater than one.

17. The method of claim 14, wherein the downlink control channel is a cell-specific reference signal (CRS)-based downlink control channel that includes consecutive REGs in each CCE.

18. The method of claim 14, further comprising:
receiving an indication of the interleaving of the plurality of modulated control symbols over the resources.

19. An apparatus for wireless communication, comprising:
means for identifying control information for transmission on a downlink control channel;
means for encoding the control information into a plurality of modulated control symbols;
means for mapping the plurality of modulated control symbols to available resources of an aggregation level candidate on the downlink control channel, wherein the means for mapping comprise:
means for mapping a first subset of consecutive modulated control symbols of the plurality of modulated control symbols to a first set of resource element groups (REGs) of the available resources corresponding to even REG indices; and
means for mapping a second subset of consecutive modulated control symbols of the plurality of modulated control symbols distinct from the first subset to a second set of REGs of the available resources corresponding to odd REG indices, wherein the mapping of the first subset and the second subset is repeated based at least in part on a number of REGs in a control channel element (CCE), and wherein a number of consecutive modulated control symbols in the first subset and a number of consecutive modulated control symbols in the second subset each correspond to a number of CCEs associated with the aggregation level candidate; and
means for transmitting the encoded control information on the downlink control channel based at least in part on the mapped plurality of modulated control symbols.

20. An apparatus for wireless communication, comprising:
means for receiving a plurality of modulated control symbols over interleaved resources of an aggregation level candidate on a downlink control channel, wherein the means for receiving comprise:
means for receiving a first subset of consecutive modulated control symbols of the plurality of modulated control symbols over a first set of resource element groups (REGs) of the interleaved resources corresponding to even REG indices; and
means for receiving a second subset of consecutive modulated control symbols of the plurality of modulated control symbols distinct from the first subset over a second set of REGs of the interleaved resources corresponding to odd REG indices, wherein the receiving of the first subset and the second subset is repeated based at least in part on a number of REGs in a control channel element (CCE), and wherein a number of consecutive modulated control symbols in the first subset and a number of consecutive modulated control symbols in the second subset each correspond to a number of CCEs associated with the aggregation level candidate;
means for de-interleaving the resources based at least in part on an aggregation level associated with the downlink control channel; and
means for decoding the plurality of modulated control symbols into control information.

21. An apparatus for wireless communication, comprising:
means for receiving a plurality of modulated control symbols interleaved over resources of an aggregation level candidate on a downlink control channel, wherein the means for receiving comprise:
means for receiving a first subset of consecutive modulated control symbols of the plurality of modulated control symbols over a first set of resource element groups (REGs) of the resources corresponding to even REG indices; and
means for receiving a second subset of consecutive modulated control symbols of the plurality of modulated control symbols distinct from the first subset over a second set of REGs of the resources corresponding to odd REG indices, wherein the receiving of the first subset and the second subset is repeated based at least in part on a number of REGs in a control channel element (CCE), and wherein a number of consecutive modulated control symbols in the first subset and a number of consecutive modulated control symbols in the second subset each correspond to a number of CCEs associated with the aggregation level candidate;
means for de-interleaving the plurality of modulated control symbols based at least in part on an aggregation level associated with the downlink control channel; and
means for decoding the plurality of modulated control symbols into control information.

22. An apparatus for wireless communication, comprising:
a processor;
memory in electronic communication with the processor; and
instructions stored in the memory and executable by the processor to cause the apparatus to:
identify control information for transmission on a downlink control channel;
encode the control information into a plurality of modulated control symbols;
map the plurality of modulated control symbols to available resources of an aggregation level candidate on the downlink control channel, wherein the instructions to map are executable by the processor to cause the apparatus to:
map a first subset of consecutive modulated control symbols of the plurality of modulated control symbols to a first set of resource element groups (REGs) of the available resources corresponding to even REG indices; and
map a second subset of consecutive modulated control symbols of the plurality of modulated control symbols distinct from the first subset to a second set of REGs of the available resources corresponding to odd REG indices, wherein the instructions executable by the processor to cause the apparatus to map the first subset and the second subset are executable by the processor to repeat based at least in part on a number of REGs in a control channel element (CCE), and wherein a number of consecutive modulated control symbols in the first subset and a number of consecutive modulated control symbols in the second subset each correspond to a number of CCEs associated with the aggregation level candidate; and transmit the encoded control information on the downlink control channel based at least in part on the mapped plurality of modulated control symbols.

23. The apparatus of claim 22, wherein the instructions are further executable by the processor to cause the apparatus to:

interleave the plurality of modulated control symbols prior to the mapping of the plurality of modulated control symbols.

24. The apparatus of claim 23, wherein the instructions to map the plurality of modulated control symbols to the available resources are further executable by the processor to cause the apparatus to:

map the interleaved plurality of modulated control symbols to the available resources one-by-one from a lowest REG index to a highest REG index.

25. The apparatus of claim 22, wherein the instructions to map the plurality of modulated control symbols to the available resources are further executable by the processor to cause the apparatus to:

map out-of-order the plurality of modulated control symbols to a plurality of REG indices such that the REG indices are interleaved.

26. The apparatus of claim 22, wherein the instructions to map the plurality of modulated control symbols are further executable by the processor to cause the apparatus to:

map out-of-order the plurality of modulated control symbols to the available resources of the aggregation level candidate for an aggregation level greater than one.

27. The apparatus of claim 26, wherein different out-of-order mappings are used for different aggregation levels greater than one.

28. The apparatus of claim 22, wherein the downlink control channel is a cell-specific reference signal (CRS)-based downlink control channel that includes consecutive REGs in each CCE.

29. The apparatus of claim 22, wherein the instructions are further executable by the processor to cause the apparatus to:

transmit an indication of the mapping of the plurality of modulated control symbols to the available resources.

30. An apparatus for wireless communication, comprising:

a processor;
memory in electronic communication with the processor; and
instructions stored in the memory and executable by the processor to cause the apparatus to:
receive a plurality of modulated control symbols over interleaved resources of an aggregation level candidate on a downlink control channel, wherein the instructions to receive are executable by the processor to cause the apparatus to:
receive a first subset of consecutive modulated control symbols of the plurality of modulated control symbols over a first set of resource element groups (REGs) of the interleaved resources corresponding to even REG indices; and
receive a second subset of consecutive modulated control symbols of the plurality of modulated control symbols distinct from the first subset over a second set of REGs of the interleaved resources corresponding to odd REG indices, wherein the instructions executable by the processor to cause the apparatus to receive the first subset and the second subset are executable by the processor to repeat based at least in part on a number of REGs in a control channel element (CCE), and wherein a number of consecutive modulated control symbols in the first subset and a number of consecutive modulated control symbols in the second subset each correspond to a number of CCEs associated with the aggregation level candidate;
de-interleave the resources based at least in part on an aggregation level associated with the downlink control channel; and
decode the plurality of modulated control symbols into control information.

31. The apparatus of claim 30, wherein an REG of the interleaved resources comprises one or more resource elements (REs).

32. The apparatus of claim 30, wherein the aggregation level associated with the downlink control channel is greater than one.

33. The apparatus of claim 30, wherein the downlink control channel is a cell-specific reference signal (CRS)-based downlink control channel that includes consecutive REGs in each CCE.

34. The apparatus of claim 30, wherein the instructions are further executable by the processor to cause the apparatus to:

receive an indication of the interleaving of the resources.

35. An apparatus for wireless communication, comprising:

a processor;
memory in electronic communication with the processor; and
instructions stored in the memory and executable by the processor to cause the apparatus to:
receive a plurality of modulated control symbols interleaved over resources of an aggregation level candidate on a downlink control channel, wherein the instructions to receive are executable by the processor to cause the apparatus to:
receive a first subset of consecutive modulated control symbols of the plurality of modulated control symbols over a first set of resource element groups (REGs) of the resources corresponding to even REG indices; and
receive a second subset of consecutive modulated control symbols of the plurality of modulated control symbols distinct from the first subset over a second set of REGs of the resources corresponding to odd REG indices, wherein the instructions executable by the processor to cause the apparatus to receive the first subset and the second subset are executable by the processor to repeat based at least in part on a number of REGs in a control channel element (CCE), and wherein a number of consecutive modulated control symbols in the first subset and a number of consecutive modulated control symbols in the second subset each correspond to a number of CCEs associated with the aggregation level candidate;

de-interleave the plurality of modulated control symbols based at least in part on an aggregation level associated with the downlink control channel; and decode the plurality of modulated control symbols into control information.

36. The apparatus of claim 35, wherein an REG of the resources comprises one or more resource elements (REs).

37. The apparatus of claim 35, wherein the aggregation level associated with the downlink control channel is greater than one.

38. The apparatus of claim 35, wherein the downlink control channel is a cell-specific reference signal (CRS)-based downlink control channel that includes consecutive REGs in each CCE.

39. The apparatus of claim 35, wherein the instructions are further executable by the processor to cause the apparatus to:

receive an indication of the interleaving of the plurality of modulated control symbols over the resources.

40. A non-transitory computer-readable medium storing code for wireless communication, the code comprising instructions executable by a processor to:

identify control information for transmission on a downlink control channel;

encode the control information into a plurality of modulated control symbols;

map the plurality of modulated control symbols to available resources of an aggregation level candidate on the downlink control channel, wherein the instructions for mapping are executable by the processor to:

map a first subset of consecutive modulated control symbols of the plurality of modulated control symbols to a first set of resource element groups (REGs) of the available resources corresponding to even REG indices; and map a second subset of consecutive modulated control symbols of the plurality of modulated control symbols distinct from the first subset to a second set of REGs of the available resources corresponding to odd REG indices, wherein the mapping of the first subset and the second subset is repeated based at least in part on a number of REGs in a control channel element (CCE), and wherein a number of consecutive modulated control symbols in the first subset and a number of consecutive modulated control symbols in the second subset each correspond to a number of CCEs associated with the aggregation level candidate; and transmit the encoded control information on the downlink control channel based at least in part on the mapped plurality of modulated control symbols.

41. A non-transitory computer-readable medium storing code for wireless communication, the code comprising instructions executable by a processor to:

receive a plurality of modulated control symbols over interleaved resources of an aggregation level candidate on a downlink control channel, wherein the instructions for receiving are executable by the processor to:

receive a first subset of consecutive modulated control symbols of the plurality of modulated control symbols over a first set of resource element groups (REGs) of the interleaved resources corresponding to even REG indices; and receive a second subset of consecutive modulated control symbols of the plurality of modulated control symbols distinct from the first subset over a second set of REGs of the interleaved resources corresponding to odd REG indices, wherein the receiving of the first subset and the second subset is repeated based at least in part on a number of REGs in a control channel element (CCE), and wherein a number of consecutive modulated control symbols in the first subset and a number of consecutive modulated control symbols in the second subset each correspond to a number of CCEs associated with the aggregation level candidate;

de-interleave the resources based at least in part on an aggregation level associated with the downlink control channel; and decode the plurality of modulated control symbols into control information.

42. A non-transitory computer-readable medium storing code for wireless communication, the code comprising instructions executable by a processor to:

receive a plurality of modulated control symbols interleaved over resources of an aggregation level candidate on a downlink control channel, wherein the instructions for receiving are executable by the processor to:

receive a first subset of consecutive modulated control symbols of the plurality of modulated control symbols over a first set of resource element groups (REGs) of the resources corresponding to even REG indices; and receive a second subset of consecutive modulated control symbols of the plurality of modulated control symbols distinct from the first subset over a second set of REGs of the resources corresponding to odd REG indices, wherein the receiving of the first subset and the second subset is repeated based at least in part on a number of REGs in a control channel element (CCE), and wherein a number of consecutive modulated control symbols in the first subset and a number of consecutive modulated control symbols in the second subset each correspond to a number of CCEs associated with the aggregation level candidate;

de-interleave the plurality of modulated control symbols based at least in part on an aggregation level associated with the downlink control channel; and decode the plurality of modulated control symbols into control information.

* * * * *